(12) United States Patent
Chiba et al.

(10) Patent No.: US 11,388,624 B2
(45) Date of Patent: Jul. 12, 2022

(54) UE AND COMMUNICATION CONTROL METHOD FOR UE

(71) Applicants: SHARP KABUSHIKI KAISHA, Sakai (JP); FG Innovation Company Limited, Tuen Mun (HK)

(72) Inventors: Shuichiro Chiba, Sakai (JP); Masafumi Aramoto, Sakai (JP); Tsuyoshi Takakura, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/961,452

(22) PCT Filed: Jan. 11, 2019

(86) PCT No.: PCT/JP2019/000680
§ 371 (c)(1),
(2) Date: Jul. 10, 2020

(87) PCT Pub. No.: WO2019/139118
PCT Pub. Date: Jul. 18, 2019

(65) Prior Publication Data
US 2021/0084529 A1   Mar. 18, 2021

(30) Foreign Application Priority Data
Jan. 12, 2018 (JP) .............................. JP2018-003301

(51) Int. Cl.
*H04W 76/12* (2018.01)
*H04W 28/02* (2009.01)

(52) U.S. Cl.
CPC ... *H04W 28/0289* (2013.01); *H04W 28/0268* (2013.01); *H04W 76/12* (2018.02)

(58) Field of Classification Search
CPC ............. H04W 28/0289; H04W 76/12; H04W 28/0268; H04W 28/02; H04W 48/12; H04M 1/00; H04M 3/00
See application file for complete search history.

(56) References Cited

U.S. PATENT DOCUMENTS

| | | | |
|---|---|---|---|
| 2018/0324645 A1* | 11/2018 | Park ...................... | H04W 76/18 |
| 2020/0367149 A1* | 11/2020 | Kang .................... | H04W 48/18 |
| 2021/0092634 A1* | 3/2021 | Kang ................ | H04W 28/0247 |

OTHER PUBLICATIONS

"3rd Generation Partnership Project; Technical Specification Group Services and System Aspects; System Architecture for the 5G System; Stage 2(Release 15)", 3GPP TS 23.501 V15.0.0 (Dec. 2017).

(Continued)

*Primary Examiner* — Lakeram Jangbahadur
(74) *Attorney, Agent, or Firm* — ScienBiziP, P.C.

(57) ABSTRACT

In a case that a network (NW) applies a plurality of congestion controls, various kinds of congestion control identification information along with a back-off timer (Session Management (SM) timer) are notified such that a terminal apparatus (UE) can apply a congestion control expected by the NW. Alternatively, in a case that the UE receives an NW-initiated SM request with the back-off timer activated, the UE is allowed to identify an SM timer intended by the NW-initiated SM request. Alternatively, in a case that the UE receives the NW-initiated SM request with the back-off timer activated, the UE is allowed to modify the association of the activated back-off timer and the congestion control to be applied. Thus, a communication control method for the terminal to apply the congestion control expected by the NW in the congestion controls applied by the NW in 5G congestion control that applies a plurality of congestion controls is provided.

1 Claim, 12 Drawing Sheets

(56) References Cited

OTHER PUBLICATIONS

"3rd Generation Partnership Project; Technical Specification Group Services and System Aspects; Procedures for the 5G System; Stage 2(Release 15)", 3GPP TS 23.502 V15.0.0 (Dec. 2017).
Vivo, "Handling of S-NSSAI based congestion control", C1-174813, 3GPP TSG-CT WG1 Meeting #107, Reno (USA), Nov. 27-Dec. 1, 2017.
Sharp, "Pseudo-CR on Intro of NAS level based congestion control", 01-174901, 3GPP TSG-CR WG1 Meeting #107, Reno (USA), Nov. 27-Dec. 1, 2017.
Sharp, "Pseudo-CR on Intro of NAS level based congestion control", C1-175145, 3GPP TSG-CT WG1 Meeting #107, Reno (USA), Nov. 27-Dec. 1, 2017.
Vivo, "Discussion on DNN based congestion control and S-NSSAI based congestion control", C1-174811, 3GPP TSG-CT WG1 Meeting #107, Reno (USA), Nov. 27-Dec. 1, 2017.
3GPP TR 24.890 V1.1.1 (Nov. 2017) 3rd Generation Partnership Project; Technical Specification Group Core Network and Terminals; 5G System—Phase 1; CT WG1 Aspects (Release 15).

* cited by examiner

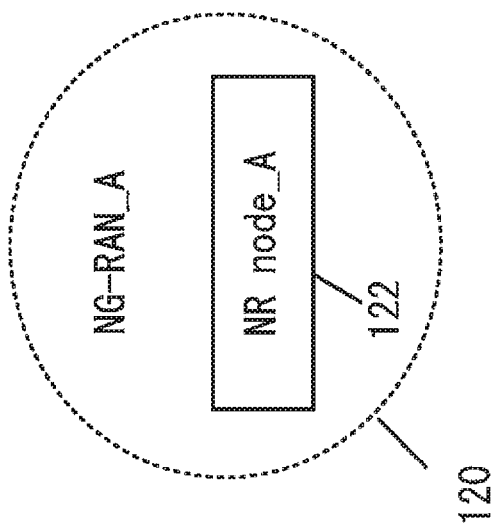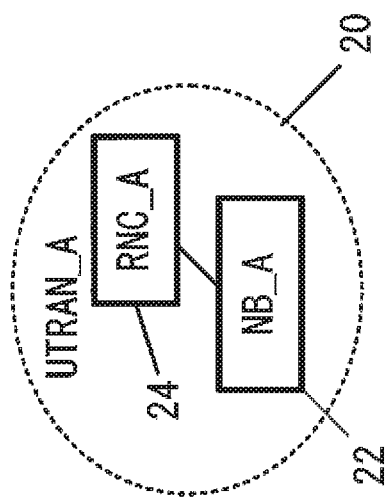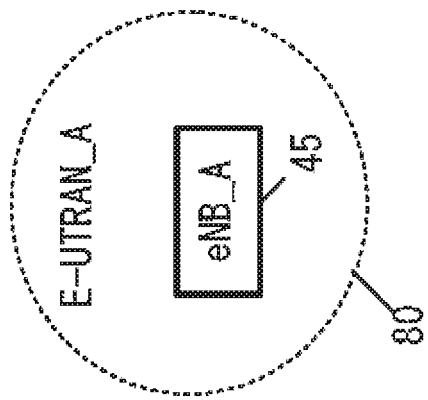
FIG. 2

ID
UE AND COMMUNICATION CONTROL METHOD FOR UE

TECHNICAL FIELD

The present application relates to UE, an apparatus within a core network, AMF, and a communication control method. This application claims priority based on JP 2018-003301 filed on Jan. 12, 2018 in Japan, the contents of which are incorporated herein in their entirety by reference.

BACKGROUND ART

The 3rd Generation Partnership Project (3GPP), which undertakes activities for standardizing recent mobile communication systems, has studied System Architecture Evolution (SAE) which is a system architecture for Long Term Evolution (LTE). The 3GPP has been standardizing an Evolved Packet System (EPS) as a communication system for implementing all Internet Protocol (IP). Note that a core network constituting an EPS is called an Evolved Packet Core (EPC).

In addition, the 3GPP recently has been studying a next-generation communication technology and a system architecture for 5th Generation (5G) mobile communication systems which are next-generation mobile communication systems, and especially, as a system for implementing 5G mobile communication systems, the 3GPP has been standardizing a 5G System (5GS) (see NPL 1 and NPL 2). In the 5GS, technical problems attributable to connection of various terminals to a cellular network are extracted to standardize solutions.

Requirements for the solutions include, for example, optimization and diversification of a communication procedure for supporting a continual mobile communication service depending on a terminal supporting various access networks, optimization of a system architecture according to the optimization and diversification of the communication procedure, and the like.

CITATION LIST

Non Patent Literature

Non Patent Literature 1: 3GPP TS 23.501 v15.0.0; 3rd Generation Partnership Project; Technical Specification Group Services and System Aspects; System Architecture for the 5G system; Stage 2 (Release 15)

Non Patent Literature 2: 3GPP TS 23.502 v15.0.0; 3rd Generation Partnership Project; Technical Specification Group Services and System Aspects; Procedures for the 5G system; Stage 2 (Release 15)

SUMMARY OF INVENTION

Technical Problem

In 5GSs, in addition to a mechanism that provides a function corresponding to congestion control in an EPS, congestion control in network slices has been investigated (see NPL 1 and NPL 2).

However, processes of how a network indicates to a terminal apparatus congestion control being applied and the process of how a terminal apparatus that has received a rejection response applies and identifies a congestion control expected by the network in a reject response to a terminal-initiated session management request in a state in which the network simultaneously applies congestion control corresponding to congestion control in an EPS and congestion control directed to network slices have not been clarified. Moreover, in a case that a terminal apparatus receives a network-initiated session management request in a state in which timers for congestion control associated with a plurality of congestion controls are activated, a process of identifying a timer for congestion control targeted by the session management request is not clarified.

In light of the foregoing circumstances, an objective of the present application is to provide a mechanism and a communication control method for implementing management processing such as congestion control for each network slice.

Solution to Problem

A User Equipment (UE) includes a controller configured to start a timer with a back-off timer value in a case that the UE receives the back-off timer value and a cause value to start the timer for a Single Network Slice Selection Assistance Information (S-NSSAI) based congestion control on a per S-NSSAI basis.

A communication control method for a User Equipment (UE) includes starting a timer with a back-off timer value in a case that the UE receives the back-off timer value and a cause value to start the timer for a Single Network Slice Selection Assistance Information (S-NSSAI) based congestion control on a per S-NSSAI basis.

Advantageous Effects of Invention

According to the above-described configuration, a terminal apparatus constituting a 5GS and an apparatus within a core network can perform management processing such as congestion control initiated by the terminal apparatus and by a network for each network slice and/or a DNN or an APN.

BRIEF DESCRIPTION OF DRAWINGS

FIG. 2 is a diagram illustrating an example of a configuration of access networks and the like within the mobile communication system.

DESCRIPTION OF EMBODIMENTS

A preferred embodiment for carrying out the present invention will be described below with reference to the drawings. Note that, as an example, an embodiment of a mobile communication system to which the present invention is applied will be described in the present embodiment.

1. System Overview

Figure 1:
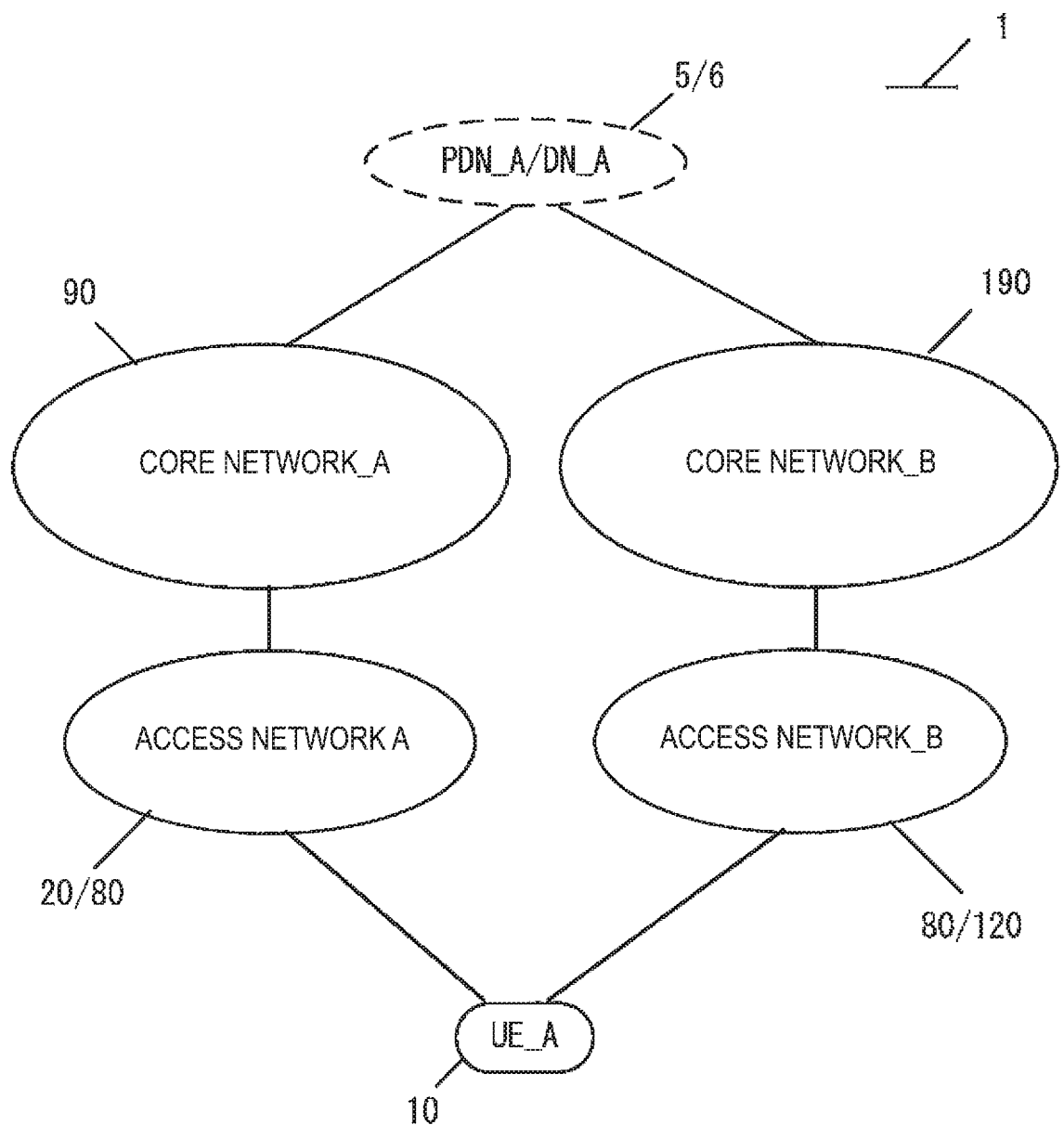
FIG. 1 is a diagram illustrating an overview of a mobile communication system.
Figure 3:
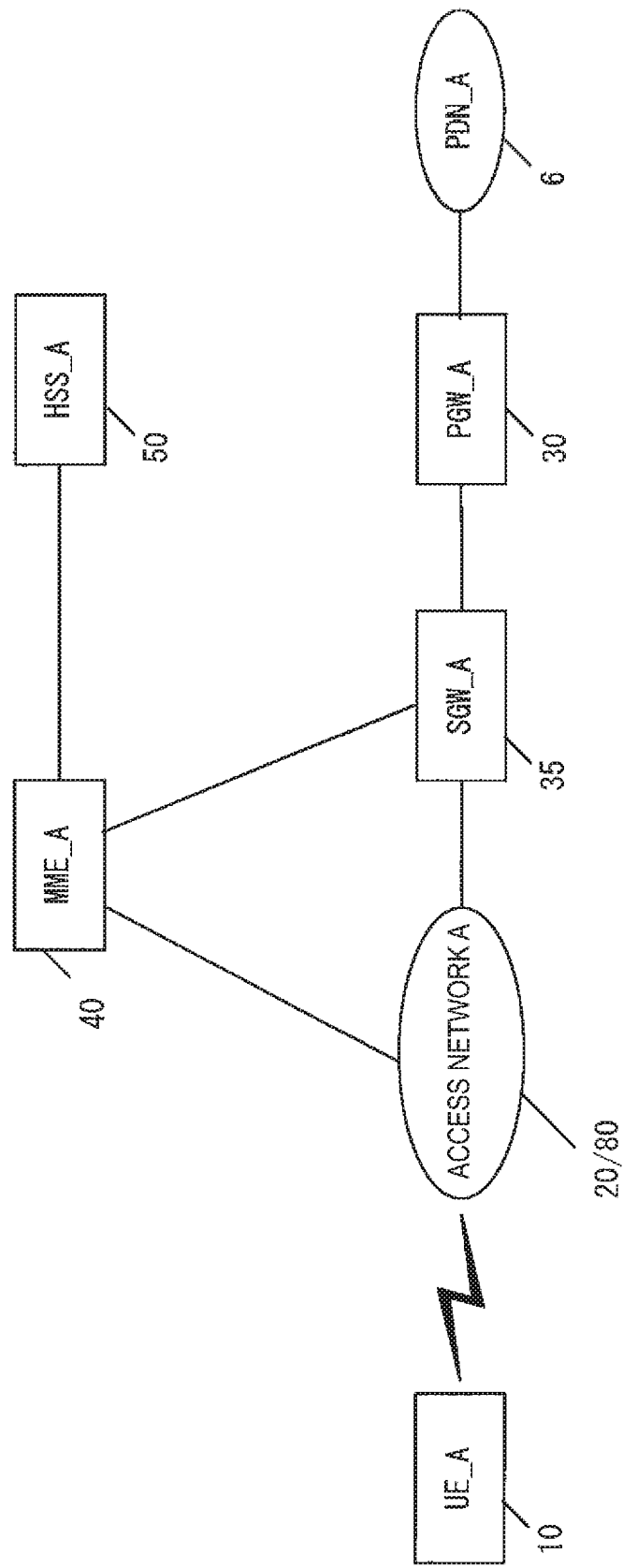
FIG. 3 is a diagram illustrating an example of a configuration of a core network_A, and the like within the mobile communication system.
Figure 4:
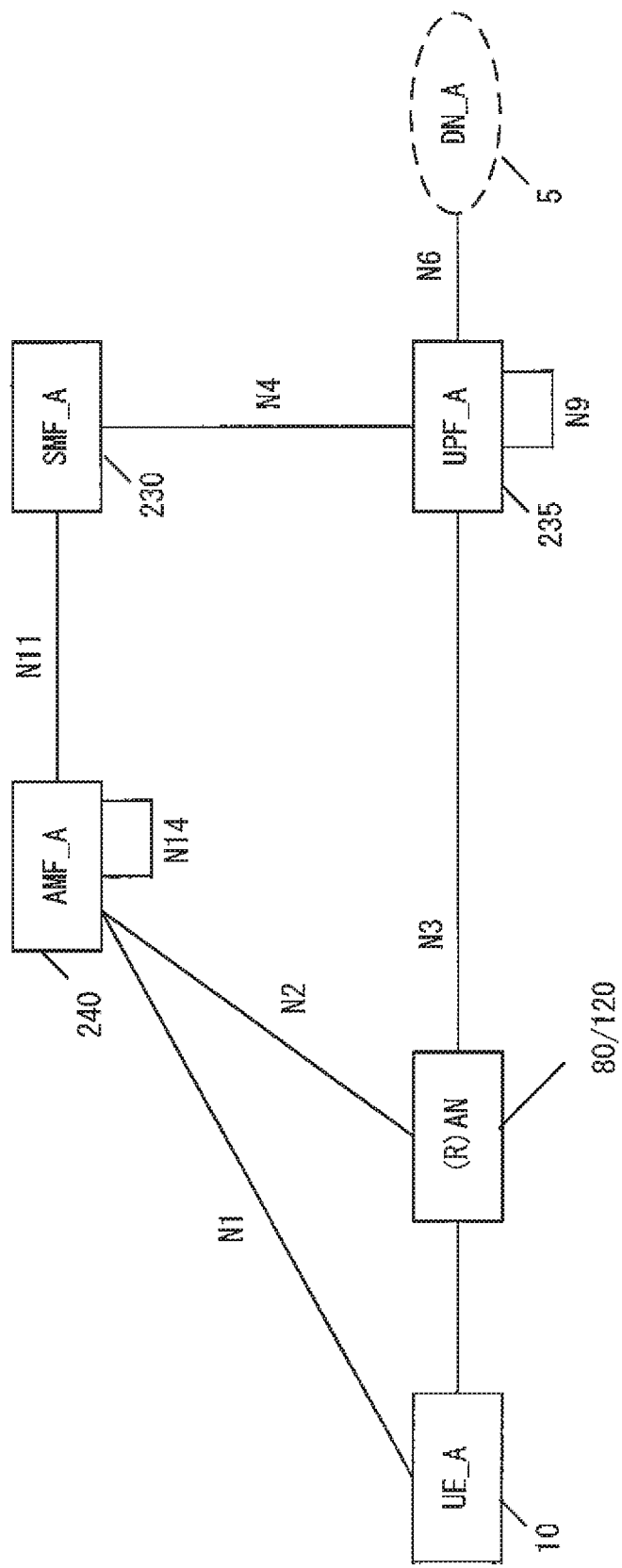
FIG. 4 is a diagram illustrating an example of a configuration of a core network_B, and the like within the mobile communication system.

An overview of a mobile communication system according to the present embodiment will be described using FIG. 1, FIG. 2, FIG. 3, and FIG. 4. FIG. 2 is a diagram illustrating details of access networks in the mobile communication system of FIG. 1. FIG. 3 is a diagram mainly illustrating details of a core network_A 90 in the mobile communication system of FIG. 1. FIG. 4 is a diagram mainly illustrating details of a core network_B 190 in the mobile communication system in FIG. 1. As illustrated in FIG. 1, the mobile communication system 1 according to the present embodiment includes a terminal apparatus (which is also referred to as a user apparatus or a mobile terminal apparatus) User Equipment (UE)_A 10, an Access Network (AN)_A, an access network_B, a Core Network (CN)_A 90, a core network_B 190, a Packet Data Network (PDN)_A 6, and a Data Network (DN)_A 5. Note that a combination of the access network_A and the core network_A 90 may be referred to as an Evolved Packet System (EPS or 4G mobile communication system), a combination of the access network_B, the core network_B 190, and the UE_A 10 may be referred to as a 5G System (5GS or 5G mobile communication system), and a configuration of the 5GS and the EPS may not be limited thereto. Note that, for the sake of simplicity, the core network_A 90, the core network_B, or a combination thereof may also be referred to as a core network, and the access network_A, the access network_B, or a combination thereof may also be referred to as an access network or a radio access network, and the DN_A 5, the PDN_A 6, or a combination thereof may also be referred to as a DN.

Here, the UE_A 10 may be an apparatus that can be connected to a network service via 3GPP access (also referred to as 3GPP access or a 3GPP access network) and/or non-3GPP access (also referred to as non-3GPP access or a non-3GPP access network). In addition, the UE_A 10 may also include a Universal Integrated Circuit Card (UICC) and an Embedded UICC (eUICC). Furthermore, the UE_A 10 may be a wirelessly connectable terminal apparatus and may be Mobile Equipment (ME), a Mobile Station (MS), a cellular Internet of Things (CIoT) terminal (CIoT UE), or the like.

In addition, the UE_A 10 can be connected to an access network and/or a core network. In addition, the UE_A 10 can be connected to the DN_A and/or the PDN_A via the access network and/or the core network. The UE_A 10 transmits and/or receives (communicates) the user data to and/or from (with) the DN_A and/or the PDN_A by using a Protocol Data Unit or Packet Data Unit (PDU) session and/or a Packet Data Network (PDN) connection (which is also referred to as a PDN connection). Furthermore, the communication of the user data is not limited to Internet Protocol (IP) communication (IPv4 or IPv6), and may be, for example, non-IP communication in the EPS, or Ethernet communication (registered trademark) or Unstructured communication in the 5GS.

Here, IP communication refers to data communication using an IP, and is data communication implemented by transmitting and/or receiving IP packets with an IP header given. Note that a payload section constituting the IP packets may include user data transmitted and/or received by the UE_A 10. Furthermore, non-IP communication refers to data communication without using an IP, and data communication implemented by transmitting and/or receiving data with no IP header given. For example, non-IP communication may be data communication implemented by transmitting and/or receiving application data without IP address, or may be transmission and/or reception of user data transmitted and/or received by the UE_A 10 with another header such as a MAC header, an Ethernet (registered trademark) frame header, or the like given.

Also, a PDU session refers to connectivity established between the UE_A 10 and the DN_A 5 to provide a PDU connection service. To be more specific, a PDU session may be connectivity established between the UE_A 10 and an external gateway. Here, the external gateway may be a UPF, a Packet Data Network Gateway (PGW), or the like. Furthermore, a PDU session may be a communication path established to transmit and/or receive user data between the UE_A 10 and the core network and/or the DN, or a communication path established to transmit and/or receive a PDU. Furthermore, a PDU session may be a session established between the UE_A 10 and the core network and/or the DN, or may be a logical communication path including a transfer path of one or more bearers and the like between apparatuses in the mobile communication system 1. To be more specific, a PDU session may be a connection established by the UE_A 10 with respect to the core network_B 190 and/or an external gateway, or may be a connection established between the UE_A 10 and a UPF. Furthermore, a PDU session may be connectivity and/or a connection between the UE_A 10 and a UPF_A 235 via an NR node_A 122. Furthermore, a PDU session may be identified by a PDU session ID and/or an EPS bearer ID.

Note that the UE_A 10 can transmit and/or receive the user data to and/or from an apparatus, such as an application server that is deployed in the DN_A 5 by using a PDU session. In other words, the PDU session enables user data transmitted and/or received between the UE_A 10 and an apparatus, such as the application server that is deployed in the DN_A 5, to be transferred. Furthermore, each apparatus (the UE_A 10, an apparatus in the access network, and/or an apparatus in the core network, and an apparatus in a data network) may associate one or more pieces of identification information with the PDU session for management. Note that these pieces of identification information may include at least one of an Access Point Name (APN), a Traffic Flow Template (TFT), a session type, application identification information, identification information of the DN_A 5, Network Slice Instance (NSI) identification information, Dedicated Core Network (DCN) identification information, or access network identification information, and may further include other information. Furthermore, in a case that a plurality of PDU sessions are established, respective pieces of identification information associated with the PDU sessions may have the same content or different content. Furthermore, the NSI identification information is information for identifying an NSI, and hereinafter may be an NSI ID or a Slice Instance ID.

In addition, the access network_A and/or the access network_B may be any of a Universal Terrestrial Radio Access Network (UTRAN)_A 20, an Evolved Universal Terrestrial Radio Access Network (E-UTRAN)_A 80, and an NG-RAN (5G-RAN)_A 120 as illustrated in FIG. 2. Note that, hereinafter, the UTRAN_A 20 and/or the E-UTRAN_A 80 and/or the NG-RAN_A 120 may be referred to as 3GPP access or a 3GPP access network, and a wireless LAN access network or a non-3GPP AN may be referred to as a non-3GPP access or a non-3GPP access network. Each radio access network includes an apparatus to which the UE_A 10 is actually connected (e.g., a base station apparatus or an access point), and the like.

For example, the E-UTRAN_A 80 is an access network for Long Term Evolution (LTE) and configured to include one or more eNBs_A 45. The eNB_A 45 is a radio base station to which the UE_A 10 connects through Evolved Universal Terrestrial Radio Access (E-UTRA). Furthermore, in a case that a plurality of eNBs are present in the E-UTRAN_A 80, the eNBs may be connected to each other.

Furthermore, the NG-RAN_A 120 is a 5G access network, may be the (R)AN illustrated in FIG. 4, and is configured to include one or more New Radio Access Technology nodes (NR nodes)_A 122 and/or an ng-eNB. Note that the NR node_A 122 is a radio base station to which the UE_A 10 connects with a 5G Radio Access and will also be referred to as gNB. Note that ng-eNB may be an eNB (E-UTRA) constituting the 5G access network, may be connected to the core network_B 190 via the NR node_A, or may be directly connected to the core network_B 190. In addition, in a case that there are a plurality of NR nodes_A 122 and/or ng-eNBs in the NG-RAN_A 120, the NR nodes_A 122 and/or ng-eNBs may be connected to one another.

Note that the NG-RAN_A 120 may be an access network configured by using the E-UTRA and/or the 5G Radio Access. In other words, the NG-RAN_A 120 may include an eNB_A 45, or an NR node_A 122, or both. In this case, the eNB_A 45 and the NR node_A 122 may be similar apparatuses. Therefore, the NR node_A 122 can be substituted with the eNB_A 45.

The UTRAN_A 20 is an access network of a 3G mobile communication system, and is configured to include a Radio Network Controller (RNC)_A 24 and a Node B (NB)_A 22. The NB_A 22 is a radio base station to which the UE_A 10 connects through Universal Terrestrial Radio Access (UTRA), and the UTRAN_A 20 may include one or a plurality of radio base stations. Furthermore, an RNC_A 24 is a controller for connecting the core network_A 90 to the NB_A 22, and the UTRAN_A 20 may be configured to include one or a plurality of RNCs. Moreover, the RNC_A 24 may be connected to one or a plurality of NBs_A 22.

Note that, in the present specification, the expression "the UE_A 10 is connected to each radio access network" means that "the UE_A 10 is connected to a base station apparatus, an access point, or the like included in each radio access network," and that data, signals, and the like are also transmitted and/or received via the base station apparatus and the access point. Note that control messages transmitted and/or received between the UE_A 10 and the core network_B 190 may be the same control message, regardless of a type of access network. Thus, "the UE_A 10 and the core network_B 190 transmit and/or receive a message to and/or from each other via the NR node_A 122" may be equivalent to "the UE_A 10 and the core network_B 190 transmit a message to each other via the eNB_A 45."

Furthermore, the access network is a radio network connected to the UE_A 10 and/or the core network. The access network may be a 3GPP access network, or a non-3GPP access network. Note that the 3GPP access network may be the UTRAN_A 20, the E-UTRAN_A 80, and the NG-Radio Access Network (RAN)_A 120, and the non-3GPP access network may be a wireless LAN access point (WLAN AN). Note that the UE_A 10 may connect to the access network or to the core network via the access network in order to connect to the core network.

Moreover, the DN_A 5 and the PDN_A 6 are Data Networks that provide communication services to the UE_A 10, may be configured as packet data service networks, or may be configured for each service. Furthermore, the DN_A 5 may include a connected communication terminal. Thus, being connected to the DN_A 5 may be being connected to a communication terminal or a server apparatus deployed in the DN_A 5. Furthermore, transmission and/or reception of user data to and/or from the DN_A 5 may mean transmission and/or reception of user data to and/or from a communication terminal or a server apparatus deployed in the DN_A 5. In addition, although the DN_A 5 is outside the core networks in FIG. 1, it may be within the core networks.

Furthermore, the core network_A 90 and/or the core network_B 190 may be configured as an apparatus within one or more core networks. Here, an apparatus within the core network may be an apparatus that performs part or all of processing or functions of apparatuses included in the core network_A 90 and/or the core network_B 190. Note that the apparatus within the core network may be referred to as a core network apparatus.

Furthermore, the core network may mean an IP mobile communication network operated by a Mobile Network Operator (MNO) connected to an access network and/or the DN. The core network may be a core network for a mobile communication operator that operates and manages the mobile communication system 1, or may be a core network for a virtual mobile communication operator or a virtual mobile communication service provider such as a Mobile Virtual Network Operator (MVNO) or a Mobile Virtual Network Enabler (MVNE). Note that the core network_A 90 may be an Evolved Packet Core (EPC) constituting an Evolved Packet System (EPS), and the core network_B 190 may be a 5G Core Network (5GC) constituting a 5GS. Furthermore, the core network_B 190 may be a core network for a system that provides 5G communication services. Conversely, the EPC may be the core network_A 90, and the 5GC may be the core network_B 190. Note that the core network_A 90 and/or the core network_B 190 are not limited to the above, and may be a network for providing mobile communication services.

Next, the core network_A 90 will be described. The core network_A 90 may include at least one of a Home Subscriber Server (HSS)_A 50, an Authentication Authorization Accounting (AAA), a Policy and Charging Rules Function (PCRF), a PGW_A 30, an ePDG, a SGW_A 35, a Mobility Management Entity (MME)_A 40, a Serving GPRS Support Node (SGSN), and an SCEF. Furthermore, these may also be configured as Network Functions (NFs). An NF may be a processing function included in a network. In addition, the core network_A 90 can be connected to a plurality of radio access networks (the UTRAN_A 20 and the E-UTRAN_A 80).

Although only the HSS (HSS_A 50), the PGW (PGW_A 30), the SGW (SGW_A 35), and the MME (MME_A 40) among the network functions are described in FIG. 3 for simplicity, it does not mean that no other apparatuses and/or NFs are included therein. Note that the UE_A 10 will also be referred to as UE, the HSS_A 50 as an HSS, the PGW_A 30 as a PGW, the SGW_A 35 as a SGW, the MME_A 40 as an MME, and the DN_A 5 and/or the PDN_A 6 as a DN or PDN for simplicity.

Each apparatus included in the core network_A 90 will be briefly described below.

The PGW_A 30 is a relay apparatus that is connected to the DN, the SGW_A 35, the ePDG, the WLAN ANa 70, the PCRF, and the AAA, and transfers user data as a gateway between the DN (the DN_A 5 and/or the PDN_A 6) and the core network_A 90. Note that the PGW_A 30 may serve as a gateway for IP communication and/or non-IP communication. Furthermore, the PGW_A 30 may have a function to transfer the IP communication, or may have a function to perform conversion between the non-IP communication and the IP communication. Note that a plurality of such gateways may be deployed in the core network_A 90. Furthermore, the plurality of gateways deployed may serve as gateways for connecting the core network_A 90 to a single DN.

Note that a User Plane (U-Plane or UP) may be a communication path for transmitting and/or receiving user data, and may include a plurality of bearers. Furthermore, a Control Plane (C-Plane or CP) may be a communication path for transmitting and/or receiving a control message, and may include a plurality of bearers.

Further, the PGW_A 30 may be connected to the SGW, the DN, a User Plane Function (UPF) and/or a Session Management Function (SMF) and may be connected to the UE_A 10 via the U-Plane. Furthermore, the PGW_A 30 may be configured integrally with the UPF_A 235 and/or the SMF_A 230.

The SGW_A 35 is a relay apparatus that is connected to the PGW_A 30, the MME_A 40, the E-UTRAN_A 80, the SGSN, and the UTRAN_A 20, and transfers user data as a gateway between the core network_A 90 and the 3GPP access networks (the UTRAN_A 20, a GERAN, and the E-UTRAN_A 80).

The MME_A 40 is a control apparatus that is connected to the SGW_A 35, the access network, the HSS_A 50, and the SCEF, and performs location information management including mobility management of the UE_A 10 via the access network, and access control. Furthermore, the MME_A 40 may include a function as a session management apparatus that manages a session established by the UE_A 10. In addition, a plurality of such control apparatuses may be deployed in the core network_A 90, and, for example, a location management apparatus different from the MME_A 40 may be configured. Like the MME_A 40, the location management apparatus different from the MME_A 40 may be connected to the SGW_A 35, the access network, the SCEF, and the HSS_A 50. Furthermore, the MME_A 40 may be connected to an Access and Mobility Management (AMF).

Furthermore, in a case that a plurality of MMEs are included in the core network_A 90, the MMEs may be connected to each other. With this configuration, a context of the UE_A 10 may be transmitted and/or received between the MMEs. In this way, the MME_A 40 is a management apparatus that transmits and/or receives control information related to mobility management and session management to and/or from the UE_A 10. In other words, it needs to be a control apparatus for a Control Plane (C-Plane or CP).

Furthermore, although the example in which the MME_A 40 is configured to be included in the core network_A 90 has been described, the MME_A 40 may be a management apparatus configured in one or more core networks, DCNs, or NSIs, or may be a management apparatus connected to one or more core networks, DCNs, or NSIs. Here, a plurality of DCNs or NSIs may be operated by a single network operator or by different network operators respectively.

In addition, the MME_A 40 may be a relay apparatus that transfers user data as a gateway between the core network_A 90 and the access network. Note that the user data transmitted and/or received by the MME_A 40 serving as a gateway may be small data.

Furthermore, the MME_A 40 may be an NF playing the role of the mobility management of the UE_A 10 or the like, or an NF that manages one or more NSIs. In addition, the MME_A 40 may be an NF playing the role of one or more of these functions. Note that the NF may be one or more apparatuses deployed in the core network_A 90, a CP function (hereinafter, also referred to as a Control Plane Function (CPF) or a Control Plane Network Function) for the control information and/or control message, or a common CP function shared between a plurality of network slices.

Here, the NF is a processing function included in a network. That is, the NF may be a function apparatus such as an MME, an SGW, a PGW, a CPF, an AMF, an SMF, or a UPF, or may be a function such as Mobility Management (MM) or Session Management (SM), or capability information. In addition, the NF may be a function apparatus to implement a single function, or a function apparatus to implement a plurality of functions. For example, an NF to implement the MM function and an NF to implement the SM function may be separately present, or an NF to implement both the MM function and the SM function may be present.

The HSS_A 50 is a management node that is connected to the MME_A 40, the AAA, and the SCEF, and manages subscriber information. The subscriber information of the HSS_A 50 is referred to during the access control performed by the MME_A 40, for example. Furthermore, the HSS_A 50 may be connected to a location management apparatus different from the MME_A 40. For example, the HSS_A 50 may be connected to the CPF_A 140.

Furthermore, the HSS_A 50, a Unified Data Management (UDM)_A 245 may be configured as different apparatuses and/or NFs or the same apparatus and/or NF.

The AAA is connected to the PGW 30, the HSS_A 50, the PCRF, and the WLAN ANa 70 and performs access control with respect to the UE_A 10 connected via the WLAN ANa 70.

The PCRF is connected to the PGW_A 30, the WLAN ANa 75, the AAA, the DN_A 5 and/or the PDN_A 6 and performs QoS management for data delivery. For example, the PCRF performs QoS management for a communication path between the UE_A 10, the DN_A 5, and/or the PDN_A 6. Furthermore, the PCRF may be an apparatus to generate and/or manage a Policy and Charging Control (PCC) rule and/or a routing rule used by each apparatus to transmit and/or receive user data.

In addition, the PCRF may be a PCF to generate and/or manage a policy. More specifically, the PCRF may be connected to the UPF_A 235.

The ePDG is connected to the PGW 30 and the WLAN ANb 75 and delivers user data as a gateway between the core network_A 90 and the WLAN ANb 75.

The SGSN is a control apparatus that is connected to the UTRAN_A 20, the GERAN, and the SGW_A 35, to perform location management between a 3G/2G access network (UTRAN/GERAN) and an LTE (4G) access network (E-UTRAN). In addition, the SGSN has functions of selecting the PGW and the SGW, managing a time zone of the UE_A 10, and selecting the MME_A 40 at the time of handover to the E-UTRAN.

The SCEF is a relay apparatus that is connected to the DN_A 5 and/or the PDN_A 6, the MME_A 40, and the HSS_A 50 and transfers the user data as a gateway connecting the DN_A 5 and/or the PDN_A 6 to the core network_A 90. Note that the SCEF may serve as a gateway for non-IP communication. Furthermore, the SCEF may have a function to perform conversion between non-IP communication and IP communication. In addition, a plurality of such gateways may be deployed in the core network_A 90. Furthermore, a plurality of gateways connecting the core network_A 90 to the single DN_A 5 and/or PDN_A 6 and/or DN may be also deployed. Note that the SCEF may be configured outside or inside the core network.

Next, the core network_B 190 will be described. The core network_B 190 may include at least one of an Authentication Server Function (AUSF), an Access and Mobility Management Function (AMF)_A 240, an Unstructured Data Storage Network Function (UDSF), a Network Exposure Function (NEF), an Network Repository Function (NRF), a Policy Control Function (PCF), a Session Management Function (SMF)_A 230, a Unified Data Management (UDM), a User Plane Function (UPF)_A 235, an Application Function (AF), or a Non-3GPP InterWorking Function (N3IWF). Furthermore, these may also be configured as Network Functions (NFs). The NF may refer to a processing function included in a network.

Although only an AMF (AMF_A 240), an SMF (SMF_A 230), and a UPF (UPF_A 235) are illustrated in FIG. 4 among the above elements for simplicity, it does not mean that elements (apparatuses and/or Network Functions (NFs)) other than the above are not included therein. Note that the UE_A 10 will also be referred to as UE, the AMF_A 240 as an AMF, the SMF_A 230 as an SMF, the UPF_A 235 as a UPF, and the DN_A 5 as a DN for simplicity.

In addition, FIG. 4 illustrates an N1 interface (hereinafter, also referred to as a reference point), an N2 interface, an N3 interface, an N4 interface, an N6 interface, an N9 interface, and an N11 interface. Here, the N1 interface is an interface between the UE and the AMF, the N2 interface is an interface between an (R) access network (AN) and the AMF, and the N3 interface is an interface between the (R) access network (AN) and the UPF, the N4 interface is an interface between the SMF and the UPF, the N6 interface is an interface between the UPF and the DN, the N9 interface is an interface between the UPF and the UPF, and the N11 interface is an interface between the AMF and the SMF. These interfaces can be used to perform communication between the apparatuses. Here, the (R)AN will be hereinafter also referred to as an NG RAN.

Each apparatus included in the core network_B 190 will be briefly described below.

First, the AMF_A 240 is connected to another AMF, the SMF (SMF_A 230), the access network (i.e., the UTRAN_A 20, the E-UTRAN_A 80, and an NG-RAN_A 120), a UDM, an AUSF, and a PCF. The AMF_A 240 may play roles of Registration management, Connection management, Reachability management, Mobility management of the UE_A 10 or the like, transfer of a Session Management (SM) message between the UE and the SMF, Access Authentication or Access Authorization, a Security Anchor Function (SEA), Security Context Management (SCM), support for the N2 interface for the N3IWF, support for transmission and/or reception of NAS signals to and/or from the UE via the N3IWF, authentication of the UE connected via the N3IWF, management of Registration Management (RM) states, management of Connection Management (CM) states, and the like. In addition, one or more AMF_As 240 may be deployed within the core network_B 190. In addition, the AMF_A 240 may be an NF that manages one or more Network Slice Instances (NSIs). In addition, the AMF_A 240 may also be a Common Control Plane Network Function (Common CPNF, or CCNF) shared by a plurality of NSIs.

Additionally, the RM state includes a deregistered state (RM-DEREGISTERED state) and a registered state (RM-REGISTERED state). In the RM-DEREGISTERED state, the UE is not registered in the network, and thus the AMF is not able to reach the UE because the UE context in the AMF does not have valid location information and routing information for the UE. In addition, in the RM-REGISTERED state, the UE is registered in the network, and thus the UE can receive services that requires registration in the network.

Additionally, the CM state includes a disconnected state (CM-IDLE state) and a connected state (CM-CONNECTED state). In the CM-IDLE state, the UE is in the RM-REGISTERED state but does not have a NAS signaling connection established between the AMF and the UE via the N1 interface. Also, in the CM-IDLE state, the UE does not have an N2 interface connection (N2 connection) and an N3 interface connection (N3 connection). On the other hand, in the CM-CONNECTED state, the UE has the NAS signaling connection established between the AMF and the UE via the N1 interface. Also, in the CM-CONNECTED state, the UE may have the N2 interface connection (N2 connection) and/or the N3 interface connection (N3 connection).

In addition, the SMF_A 230 may have functions of Session Management (SM) of PDU sessions, or the like, IP address allocation for the UE and management, UPF selection and control, UPF configuration for routing traffic to an appropriate destination, reporting arrival of downlink data (Downlink Data Notification), provision of SM information unique to the AN (for each AN) to be transmitted to the AN via the AMF and the N2 interface, determination of a Session and Service Continuity mode (SSC mode) for a session, roaming, and the like. In addition, the SMF_A 230 may be connected to the AMF_A 240, the UPF_A 235, the UDM, and the PCF.

The UPF_A 235 is connected to the DN_A 5, the SMF_A 230, another UPF, and the access network (i.e., the UTRAN_A 20, the E-UTRAN_A 80, and the NG-RAN_A 120). The UPF_A 235 may play roles of an anchor to intra-RAT mobility or inter-RAT mobility, packet routing & forwarding, an Uplink Classifier (UL CL) function to support routing of a plurality of traffic flows for one DN, a Branching point function to support a multi-homed PDU session, QoS processing for a user plane, verification of uplink traffic, buffering of downlink packets, a function of triggering Downlink Data Notification, and the like. Furthermore, the UPF_A 235 may be a relay apparatus that transfers the user data as a gateway between the DN_A 5 and the core network_B 190. Note that the UPF_A 235 may serve as a gateway for IP communication and/or non-IP communication. Furthermore, the UPF_A 235 may have a function to transfer IP communication or a function to perform conversion between non-IP communication and IP communication. Furthermore, a plurality of deployed gateways may serve as gateways for connecting the core network_B 190 to a single DN. Note that the UPF_A 235 may have connectivity with another NF and may be connected to each apparatus via another NF.

Note that a UPF_C 239 (also referred to as a branching point or an uplink classifier), which is a UPF different from the UPF_A 235, may be present between the UPF_A 235 and the access network as an apparatus or an NF. In the case that the UPF_C 239 is present, a PDU session between the UE_A 10 and the DN_A 5 is established via the access network, the UPF_C 239, and the UPF_A 235.

Additionally, the AUSF is connected to the UDM and the AMF_A 240. The AUSF functions as an authentication server.

The UDSF provides a function for all NFs to store or retrieve information as unstructured data.

The NEF provides a means to safely provide services and capabilities provided by the 3GPP network. Information received from another NF is stored as structured data.

In a case that an NF Discovery Request is received from an NF instance, the NRF provides the NF with information of found NF instances or holds information of available NF instances or services supported by the instances.

The PCF is connected to the SMF (SMF_A 230), the AF, and the AMF_A 240. The PCF provides a policy rule and the like.

The UDM is connected to the AMF_A 240, the SMF (SMF_A 230), the AUSF, and the PCF. The UDM includes a UDM FE (application front end) and a User Data Repository (UDR). The UDM FE performs processing of authentication information (credentials), location management, subscriber management (subscription management), and the like. The UDR stores data necessary for the UDM FE for provision and policy profiles necessary for the PCF.

The AF is connected to the PCF. The AF affects traffic routing or is involved in policy control.

The N3IWF provides functions of establishing an IPsec tunnel with the UE, relaying NAS (N1) signaling between the UE and the AMF, processing N2 signaling transmitted from the SMF and relayed by the AMF, establishing IPsec Security Association (IPsec SA), relaying user plane packets between the UE and the UPF, selecting the AMF, and the like.

1.2. Configuration of Each Apparatus

A configuration of each apparatus will be described below. Note that some or all of apparatuses to be described below and functions of units of the apparatuses may operate on physical hardware, or logical hardware which is virtually configured on general-purpose hardware.

1.2.1. Configuration of UE

Figure 5:
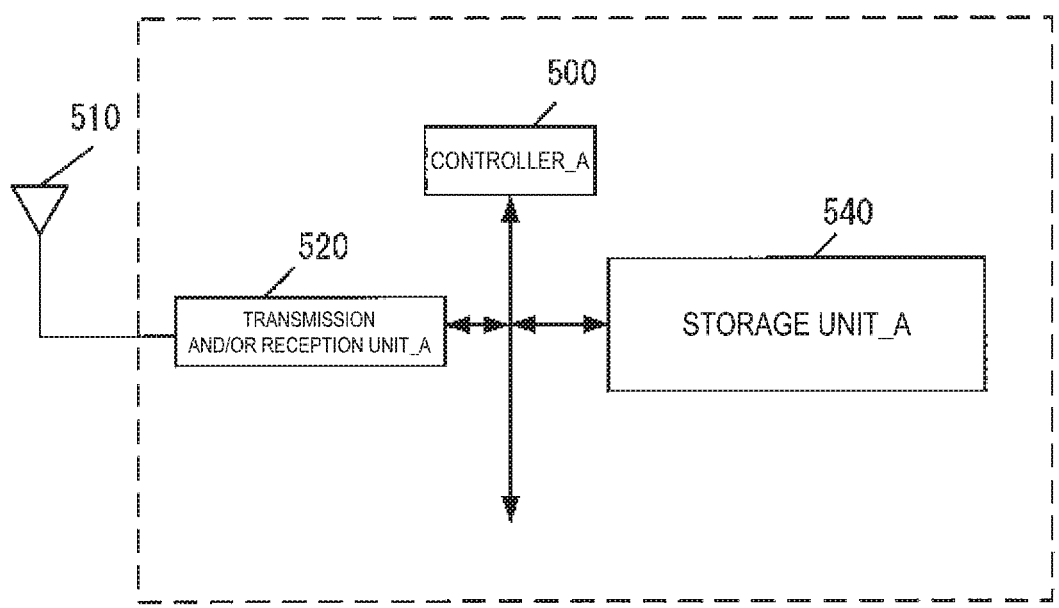
FIG. 5 is a diagram illustrating an apparatus configuration of UE.

First, an example of an apparatus configuration of the UE_A 10 is illustrated in FIG. 5. As illustrated in FIG. 5, the UE_A 10 includes a controller_A 500, a transmission and/or reception unit_A 520, and a storage unit_A 540. The transmission and/or reception unit_A 520 and the storage unit_A 540 are connected to the controller_A 500 via a bus. Furthermore, an external antenna 410 is connected to the transmission and/or reception unit_A 520.

The controller_A 500 is a functional unit for controlling the entire UE_A 10 and implements various processes of the entire UE_A 10 by reading out various types of information and programs stored in the storage unit_A 540 for execution.

The transmission and/or reception unit_A 520 is a functional unit through which the UE_A 10 connects to the base station (the UTRAN_A 20, the E-UTRAN_A 80, the NG-RAN_A 120) and/or the wireless LAN access point (the WLAN AN) in the access network to connect to the access network. In other words, the UE_A 10 can connect to the base station and/or the access point in the access network via the external antenna 410 connected to the transmission and/or reception unit_A 520. To be specific, the UE_A 10 can transmit and/or receive user data and/or control information to and/or from the base station and/or the access point in the access network via the external antenna 410 connected to the transmission and/or reception unit_A 520.

The storage unit_A 540 is a functional unit that stores programs, data, and the like necessary for each operation of the UE_A 10, and includes, for example, a semiconductor memory, a Hard Disk Drive (HDD), a Solid State Drive (SSD), or the like. The storage unit_A 540 stores identification information, control information, a flag, a parameter, a rule, a policy, and the like included in a control message which is transmitted and/or received in the communication procedure described below.

1.2.2. eNB/NR Node

Figure 6:
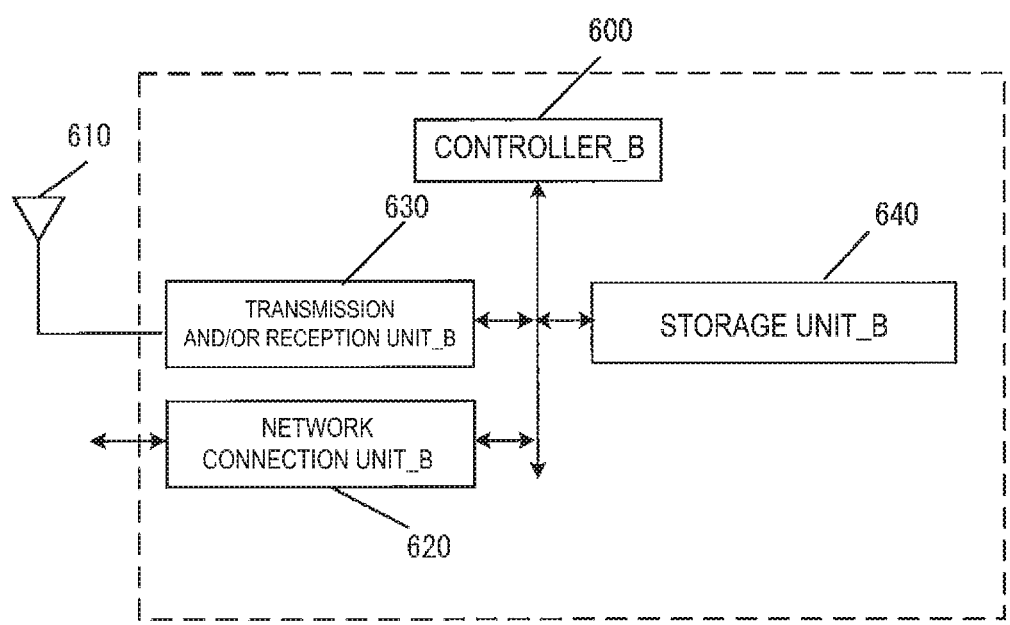
FIG. 6 is a diagram illustrating an apparatus configuration of an eNB/NR node.

Next, FIG. 6 illustrates an example of an apparatus configuration of the eNB_A 45 and the NR node_A 122. As illustrated in FIG. 6, the eNB_A 45 and the NR node_A 122 include a controller_B 600, a network connection unit_B 620, a transmission and/or reception unit_B 630, and a storage unit_B 640. The network connection unit_B 620, the transmission and/or reception unit_B 630, and the storage unit_B 640 are connected to the controller_B 600 via a bus. Furthermore, an external antenna 510 is connected to the transmission and/or reception unit_B 630.

The controller_B 600 is a functional unit for controlling all of the eNB_A 45 and the NR node_A 122, and implements various kinds of processing of all of the eNB_A 45 and the NR node_A 122 by reading out various types of information and programs stored in the storage unit_B 640 for execution.

The network connection unit_B 620 is a functional unit through which the eNB_A 45 and the NR node_A 122 connect to the AMF_A 240 and the UPF_A 235 within the core network. In other words, the eNB_A 45 and the NR node_A 122 can be connected to the AMF_A 240 and the UPF_A 235 within the core network via the network connection unit_B 620. Specifically, the eNB_A 45 and the NR node_A 122 can transmit and/or receive user data and/or control information to and/or from the AMF_A 240 and/or the UPF_A 235 via the network connection unit_B 620.

The transmission and/or reception unit_B 630 is a functional unit through which the eNB_A 45 and the NR node_A 122 connect to the UE_A 10. In other words, the eNB_A 45 and the NR node_A 122 can transmit and/or receive user data and/or control information to and/or from the UE_A 10 via the transmission and/or reception unit_B 630.

The storage unit_B 640 is a functional unit for storing programs, data, and the like necessary for each operation of the eNB_A 45 and the NR node_A 122. The storage unit_B 640 includes, for example, a semiconductor memory, an HDD, an SSD, or the like. The storage unit_B 640 stores identification information, control information, a flag, a parameter, and the like included in a control message which is transmitted and/or received in a communication procedure described below. The storage unit_B 640 may store the information as the contexts for each UE_A 10.

1.2.3. Configuration of MME/AMF

Figure 7:
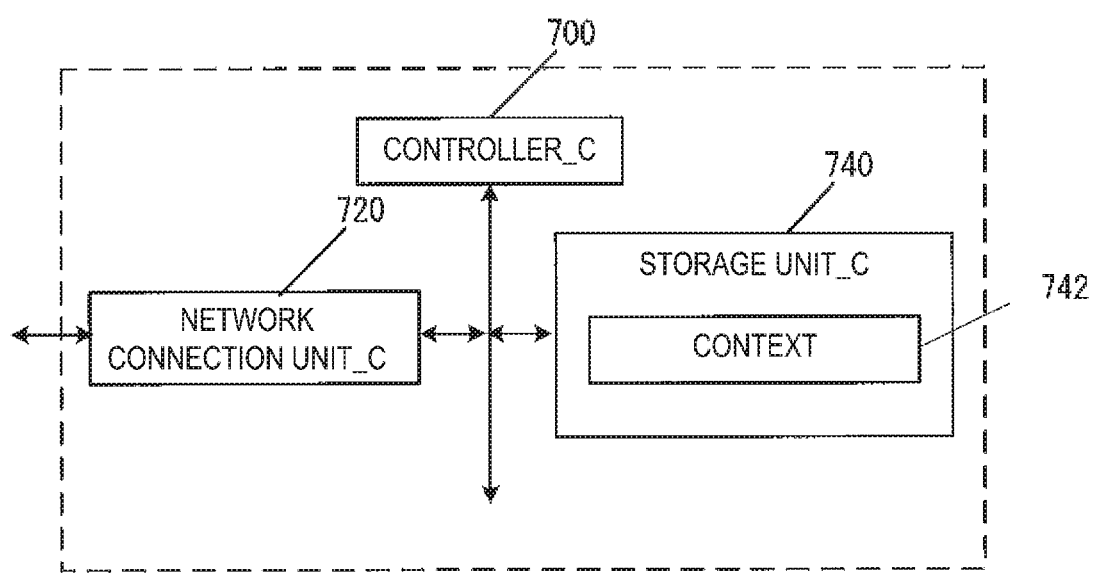
FIG. 7 is a diagram illustrating an apparatus configuration of an MME/AMF.

Next, FIG. 7 illustrates an example of an apparatus configuration of the MME_A 40 and/or the AMF_A 240. As illustrated in FIG. 7, the MME_A 40 and/or the AMF_A 240 include a controller_C 700, a network connection unit_C 720, and a storage unit_C 740. The network connection unit_C 720 and the storage unit_C 740 are connected to the controller_C 700 via a bus. Furthermore, the storage unit_C 740 stores a context 642.

The controller_C 700 is a functional unit that controls the entire MME_A 40 or AMF_A 240 and implements various kinds of processing of the entire AMF_A 240 by reading out various kinds of information and programs stored in the storage unit_C 740 for execution.

The network connection unit_C 720 is a functional unit through which the MME_A 40 and/or the AMF_A 240 connect to another MME_A 40, AMF 240, SMF_A 230, a base station (the UTRAN_A 20, the E-UTRAN_A 80 and the NG-RAN_A 120) within the access network and/or a wireless LAN access point (WLAN AN), the UDM, the AUSF, and the PCF. In other words, the MME_A 40 or the AMF_A 240 can transmit and/or receive user data and/or control information to and/or from the base station and/or an access point within the access network, the UDM, the AUSF, and the PCF via the network connection unit_C 720.

The storage unit_C 740 is a functional unit that stores programs, data, and the like necessary for each operation of the MME_A 40 or the AMF_A 240. The storage unit_C 740 includes, for example, a semiconductor memory, an HDD, an SSD, or the like. The storage unit_C 740 stores identification information, control information, a flag, a parameter, and the like included in a control message which is transmitted and/or received in the communication procedure described below. Examples of the context 642 stored in the storage unit_C 740 may include a context stored for each UE, a context stored for each PDU session, and a context stored for each bearer. The context stored for each UE may include an IMSI, an MSISDN, an MM State, a GUTI, a ME Identity, a UE Radio Access Capability, a UE Network Capability, an MS Network Capability, an Access Restriction, an MME F-TEID, an SGW F-TEID, an eNB Address, an MME UE S1AP ID, an eNB UE S1AP ID, an NR node Address, an NR node ID, a WAG Address, and a WAG ID. Furthermore, the context stored for each PDU session may include an APN in Use, an Assigned Session Type, IP Address(es), a PGW F-TEID, an SCEF ID, and a Default bearer. Furthermore, the context stored for each bearer may include an EPS Bearer ID, a TI, a TFT, an SGW F-TEID, a PGW F-TEID, an MME F-TEID, an eNB Address, an NR node Address, a WAG Address, an eNB ID, an NR node ID, and a WAG ID.

1.2.4. Configuration of SMF

Figure 8:
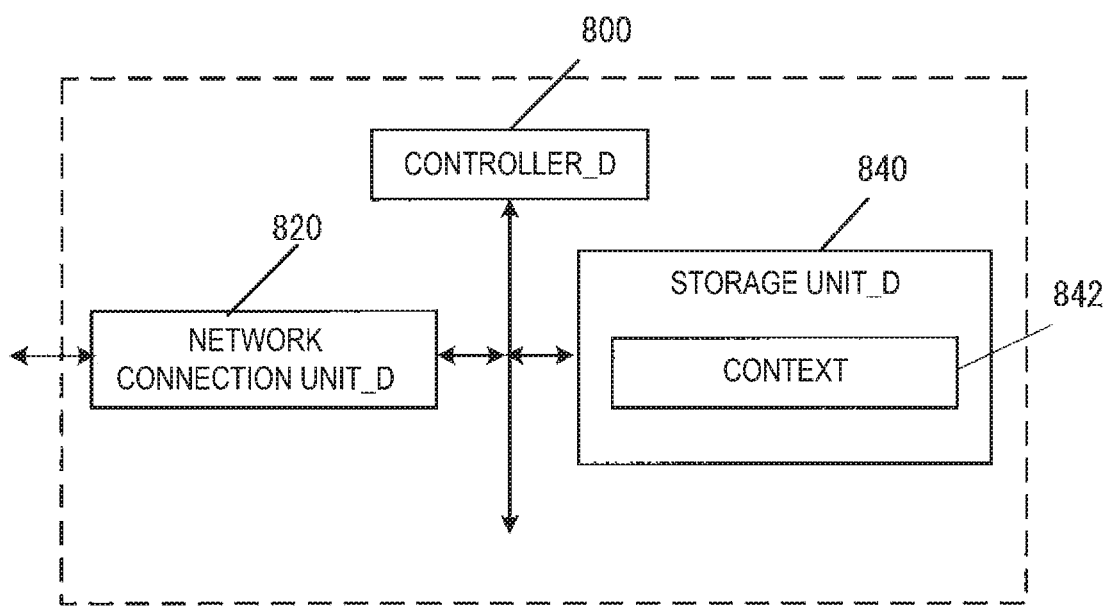
FIG. 8 is a diagram illustrating an apparatus configuration of an SMF/PGW/UPF.

Next, FIG. 8 illustrates an example of an apparatus configuration of the SMF_A 230. As illustrated in FIG. 8, the SMF_A 230 includes a controller_D 800, a network connection unit_D 820, and a storage unit_D 840. The network connection unit_D 820 and the storage unit_D 840 are connected to the controller_D 800 via a bus. In addition, the storage unit_D 840 stores a context 742.

The controller_D 800 of the SMF_A 230 is a functional unit that controls the entire SMF_A 230 and implements various kinds of processing of the entire SMF_A 230 by reading out various types of information and programs stored in the storage unit_D 840 for execution.

In addition, the network connection unit_D 820 of the SMF_A 230 is a functional unit for the SMF_A 230 to connect to the AMF_A 240, the UPF_A 235, the UDM, and the PCF. In other words, the SMF_A 230 can transmit and/or receive user data and/or control information to and/or from the AMF_A 240, the UPF_A 235, the UDM, and the PCF via the network connection unit_D 820.

Furthermore, the storage unit_D 840 of the SMF_A 230 is a functional unit that stores programs, data, and the like necessary for each operation of the SMF_A 230. The storage unit_D 840 of the SMF_A 230 includes, for example, a semiconductor memory, an HDD, an SSD, or the like. The storage unit_D 840 of the SMF_A 230 stores identification information, control information, a flag, a parameter, and the like included in a control message which is transmitted and/or received in the communication procedure described below. In addition, examples of the context 742 stored in the storage unit_D 840 of the SMF_A 230 may include a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each Data Network Identifier. The context stored for each PDU session may include an Assigned Session Type, IP Address(es), an SGW F-TEID, a PGW F-TEID, and a Default Bearer. The context stored for each bearer may include an EPS Bearer ID, a TFT, an SGW F-TEID, and a PGW F-TEID.

1.2.5. Configuration of PGW/UPF

Next, FIG. 8 illustrates an example of an apparatus configuration of the PGW_A 30 and/or the UPF_A 235. As illustrated in FIG. 8, each of the PGW_A 30 and/or the UPF_A 235 includes a controller_D 800, a network connection unit_D 820, and a storage unit_D 840. The network connection unit_D 820 and the storage unit_D 840 are connected to the controller_D 800 via a bus. In addition, the storage unit_D 840 stores a context 742.

The controller_D 800 of the PGW_A 30 or the UPF_A 235 is a functional unit that controls the entire PGW_A 30 or UPF_A 235, and implements various types of processing of the entire PGW_A 30 or the UPF_A 235 by reading out various types of information and programs stored in the storage unit_D 840 for execution.

In addition, the network connection unit_D 820 of the PGW_A 30 or the UPF_A 235 is a functional unit for the PGW_A 30 or the UPF_A 235 to connect to the DN (that is, the DN_A 5), the SMF_A 230, another UPF_A 235, and the access networks (that is, the UTRAN_A 20, the E-UTRAN_A 80, and the NG-RAN_A 120). In other words, the UPF_A 235 can transmit and/or receive the user data and/or the control information to and from the DN (that is, the DN_A 5), the SMF_A 230, another UPF_A 235, and the access networks (that is, the UTRAN_A 20, the E-UTRAN_A 80, and the NG-RAN_A 120) via the network connection unit_D 820.

In addition, the storage unit_D 840 of the UPF_A 235 is a functional unit that stores programs, data, and the like necessary for each operation by the UPF_A 235. The storage unit_D 840 of the UPF_A 235 includes, for example, a semiconductor memory, an HDD, an SSD, or the like. The storage unit_D 840 of the UPF_A 235 stores identification information, control information, a flag, a parameter, and the like included in the control message transmitted and/or received in the communication procedure described below. In addition, examples of the context 742 stored in the storage unit_D 840 of the UPF_A 235 may include a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each Data Network Identifier. The context stored for each PDU session may include an Assigned Session Type, IP Address(es), an SGW F-TEID, a PGW F-TEID, and a Default Bearer. The context stored for each bearer may include an EPS Bearer ID, a TFT, an SGW F-TEID, and a PGW F-TEID.

1.2.6. Information Stored in Storage Unit of Each Above-Described Apparatus

Next, each piece of information stored in the storage unit of each of the above-described apparatuses will be described.

An International Mobile Subscriber Identity (IMSI) is permanent identification information of a subscriber (user), and is identification information assigned to a user using the UE. The IMSI stored by the UE_A 10, the MME_A 40/CPF_A 140/AMF_A 2400, and the SGW_A 35 may be the same as the IMSI stored by an HSS_A 50.

The EMM State/MM State indicates a Mobility management state of the UE_A 10 or the MME_A 40/CPF_A 140/AMF_A 240. For example, the EMM State/MM State may be an EMM-REGISTERED state (registered state) in which the UE_A 10 is registered in a network, and/or an EMM-DEREGISTERD state (non-registered state) in which the UE_A 10 is not registered in a network. In addition, the EMM State/MM State may be an ECM-CONNECTED state in which a connection is maintained between the UE_A 10 and the core network, and/or an ECM-IDLE state in which the connection is released. Note that the EMM State/MM State may be information for distinguishing a state in which the UE_A 10 is registered in the EPC from a state in which the UE_A 10 is registered in an NGC or 5GC.

A Globally Unique Temporary Identity (GUTI) is temporary identification information of the UE_A 10. The GUTI includes identification information (Globally Unique MME Identifier (GUMMEI)) of the MME_A 40/CPF_A 140/AMF_A 240 and identification information (M-Temporary Mobile Subscriber Identity (M-TMSI)) of the UE_A 10 in a specific MME_A 40/CPF_A 140/AMF_A 240. The ME Identity is an ID of the UE_A 10 or the ME, and may be an International Mobile Equipment Identity (IMEI) or an IMEI Software Version (IMEISV), for example. The MSISDN represents a basic telephone number of the UE_A 10. The MSISDN stored by the MME_A 40/CPF_A 140/AMF_A 240 may be information indicated by the storage unit of the HSS_A 50. Note that the GUTI may include information for identifying the CPF 140.

The MME F-TEID is information for identifying the MME_A 40/CPF_A 140/AMF_A 240. The MME F-TEID may include an IP address of the MME_A 40/CPF_A 140/AMF_A 240, a Tunnel Endpoint Identifier (TEID) of the MME_A 40/CPF_A 140/AMF_A 240, or both of them. Furthermore, the IP address of the MME_A 40/CPF_A 140/AMF_A 240 and the TEID of the MME_A 40/CPF_A 140/AMF_A 240 may be stored independently of each other. In addition, the MME F-TEID may be identification information for user data, or identification information for control information.

The SGW F-TEID is information for identifying the SGW_A 35. The SGW F-TEID may include an IP address of the SGW_A 35, a TEID of the SGW_A 35, or both of them. In addition, the IP address of the SGW_A 35 and the TEID of the SGW_A 35 may be stored independently of each other. In addition, the SGW F-TEID may be identification information for user data, or identification information for control information.

The PGW F-TEID is information for identifying the PGW_A 30/UPGW_A 130/SMF_A 230/UPF_A 235. The PGW F-TEID may include an IP address of the PGW_A 30/UPGW_A 130/SMF_A 230/UPF_A 235, a TEID of the PGW_A 30/UPGW_A 130/SMF_A 230/UPF_A 235, or both of them. In addition, the IP address of the PGW_A 30/UPGW_A 130/SMF_A 230/UPF_A 235 and the TEID of the PGW_A 30/UPGW_A 130/SMF_A 230/UPF_A 235 may be stored independently of each other. In addition, the PGW F-TEID may be identification information for user data, or identification information for control information.

The eNB F-TEID is information for identifying the eNB_A 45. The eNB F-TEID may include an IP address of the eNB_A 45, a TEID of the eNB_A 45, or both of them. In addition, the IP address of the eNB_A 45 and the TEID of the SGW_A 35 may be stored independently of each other. In addition, the eNB F-TEID may be identification information for user data, or identification information for control information.

In addition, the APN may be identification information for identifying the core network and an external network such as the DN. Furthermore, the APN can also be used as information for selecting a gateway such as the PGW_A 30/UPGW_A 130/UPF_A 235 for connecting the core network A_90. Note that the APN may be a Data Network Name (DNN). Thus, the APN may be represented by a DNN, or the DNN may be represented by the APN.

Note that the APN may be identification information for identifying such a gateway, or identification information for identifying an external network such as the DN. Note that, in a case that a plurality of gateways connecting the core network and the DN are deployed, there may be a plurality of gateways that can be selected according to the APN. Furthermore, one gateway may be selected among such a plurality of gateways in another method using identification information other than the APN.

A UE Radio Access Capability is identification information indicating a radio access capability of the UE_A 10. A UE Network Capability includes an algorithm of security supported by the UE_A 10 and a key derivation function. An MS Network Capability is information including, for the UE_A 10 having a function of a GERAN_A 25 and/or the UTRAN_A 20, one or more pieces of information necessary for an SGSN_A 42. An Access Restriction is registration information for access restriction. An eNB Address is an IP address of the eNB_A 45. An MME UE S1AP ID is information for identifying the UE_A 10 within the MME_A 40/CPF_A 140/AMF_A 240. An eNB UE S1AP ID is information for identifying the UE_A 10 within the eNB_A 45.

The APN in Use is an APN recently used. The APN in Use may be Data Network Identifier. This APN may include identification information of the network and identification information of a default operator. Furthermore, the APN in Use may be information for identifying a DN with which the PDU session is to be established.

The Assigned Session Type is information indicating a PDU session type. The Assigned Session Type may be Assigned PDN Type. The PDU session type may be IP, or non-IP. Furthermore, in a case that the PDU session type is IP, information indicating a PDN type allocated by the network may be further included. Note that the Assigned Session Type may be IPv4, IPv6, or IPv4v6.

In addition, unless specified otherwise, the IP Address refers to an IP address allocated to the UE. The IP address may be an IPv4 address, an IPv6 address, an IPv6 prefix, or an interface ID. Note that, in a case that the Assigned Session Type indicates non-IP, an element of the IP Address may not be included.

A DN ID is identification information for identifying the core network_B 190 and an external network such as the DN. Furthermore, the DN ID can also be used as information for selecting a gateway such as the UPGW_A 130 or the PF_A 235 connecting the core network_B 190.

Note that the DN ID may be identification information for identifying such a gateway, or identification information for identifying an external network such as the DN. Note that, in a case that a plurality of gateways connecting the core network_B 190 and the DN are deployed, there may be a plurality of gateways that can be selected according to the DN ID. Furthermore, one gateway may be selected among such a plurality of gateways in another method using identification information other than the DN ID.

Furthermore, the DN ID may be information equivalent to the APN, or different from the APN. Note that in a case that the DN ID is information different from the APN, each apparatus may manage information indicating mapping between the DN ID and the APN, perform a procedure to inquire of the APN by using the DN ID, or perform a procedure to inquire of the DN ID by using the APN.

An SCEF ID is an IP address of an SCEF_A 46 used in a PDU session. A Default Bearer is information acquired and/or generated at a time when a PDU session is established and is EPS bearer identification information for identifying a default bearer associated with the PDU session.

An EPS Bearer ID is identification information of an EPS bearer. In addition, the EPS Bearer ID may be identification information for identifying a Signalling Radio Bearer (SRB) and/or a Control-plane Radio bearer (CRB), or identification information for identifying a Data Radio Bearer (DRB). A Transaction Identifier (TI) is identification information for identifying a bidirectional message flow (Transaction). Note that the EPS Bearer ID may be EPS bearer identification information for identifying a dedicated bearer. Therefore, the EPS bearer ID may be identification information for identifying an EPS bearer different from a default bearer. The TFT indicates all packet filters associated with the EPS bearer. The TFT is information for identifying some pieces of user data to be transmitted and/or received, and thus, the UE_A 10 uses the EPS bearer associated with the TFT to transmit and/or receive the user data identified by the TFT. In other words, the UE_A 10 uses a Radio Bearer (RB) associated with the TFT to transmit and/or receive the user data identified by the TFT. In addition, the TFT may associate the user data such as application data to be transmitted and/or received with an appropriate transfer path, and may be identification information for identifying application data. In addition, the UE_A 10 may use the default bearer to transmit and/or receive user data which cannot be identified by the TFT. In addition, the UE_A 10 may store in advance the TFT associated with the default bearer.

The Default Bearer is EPS bearer identification information for identifying a default bearer associated with a PDU session. Note that the EPS bearer may be a logical communication path established between the UE_A 10 and the PGW_A 30/UPGW_A 130/UPF_A 235, or a communication path constituting a PDN connection/PDU session. Furthermore, the EPS bearer may be a default bearer, or a dedicated bearer. Furthermore, the EPS bearer may include an RB established between the UE_A 10 and the base station and/or the access point within the access network. Furthermore, the RB and the EPS bearer may be associated with each other on a one-to-one basis. Therefore, identification information of the RB may be associated with the identification information of the EPS bearer on a one-to-one basis, or may be the same identification information. Note that the RB may be an SRB and/or a CRB, or a DRB. Furthermore, the Default Bearer may be information that the UE_A 10 and/or the SGW_A 35 and/or the PGW_A 30/UPGW_A 130/SMF_A 230/UPF_A 235 acquire from the core network at a time when a PDU session is established. Note that the default bearer is an EPS bearer first established during a PDN connection/PDU session, and is such an EPS bearer, only one of which can be established during one PDN connection/PDU session. The default bearer may be an EPS bearer that can be used for communication of user data not associated with the TFT. In addition, a dedicated bearer is an EPS bearer established after the default bearer is established during the PDN connection/PDU session, and is such an EPS bearer, a plurality of which can be established during one PDN connection/PDU session. The dedicated bearer is an EPS bearer that can be used for communication of user data associated with the TFT.

A User Identity is information for identifying a subscriber. The User Identity may be an IMSI, or an MSISDN. Furthermore, the User Identity may also be identification information other than the IMSI or the MSISDN. Serving Node Information is information for identifying the MME_A 40/CPF_A 140/AMF_A 240 used in a PDU session, and may be an IP address of the MME_A 40/CPF_A 140/AMF_A 240.

An eNB Address is an IP address of the eNB_A 45. An eNB ID is information for identifying the UE in the eNB_A 45. An MME Address is an IP address of the MME_A 40/CPF_A 140/AMF_A 240. An MME ID is information for identifying the MME_A 40/CPF_A 140/AMF_A 240. An NR node Address is an IP address of the NR node_A 122. An NR node ID is information for identifying the NR node_A 122. A WAG Address is an IP address of a WAG. A WAG ID is information for identifying a WAG.

1.3. Description of Initial Procedure

Next, before describing a detailed order of an initial procedure in the present embodiment, in order to avoid redundant descriptions, terminology specific to the present embodiment and primary identification information used in each procedure will be described beforehand.

In the present embodiment, a network refers to at least some of the access network_A 20/80, the access network_B 80/120, the core network_A 90, the core network_B 190, the DN_A 5, and the PDN_A 6. In addition, one or more apparatuses included in at least some of the access network_A 20/80, the access network_B 80/120, the core network_A 90, the core network_B 190, the DN_A 5, and the PDN_A 6 may also be referred to as a network or a network apparatus. Specifically, the expression "a network performs transmission and/or reception of a message and/or performs a procedure" signifies that "an apparatus (network apparatus) within a network performs transmission and/or reception of a message and/or performs a procedure."

In the present embodiment, a Session Management (SM) message (also referred to as a Non-Access-Stratum (NAS) SM message or a SM message) may be a NAS message used in a procedure for the SM (also referred to as a session management procedure or an SM procedure), or may be a control message transmitted and/or received between the UE_A 10 and the SMF_A 230 via the AMF_A 240. Furthermore, the SM message may include a PDU session establishment request message, a PDU session establishment accept message, a PDU session complete message, a PDU session reject message, a PDU session modification request message, a PDU session modification accept message, a PDU session modification reject message, and the like. In addition, the procedure for SM may include a PDU session establishment procedure, a PDU session modification procedure, and the like.

In the present embodiment, a Tracking Area (TA) is a range that can be represented by location information of the UE_A 10 managed by the core network, and may include one or more cells, for example. Furthermore, the TA may be a range in which a control message such as a paging message is broadcast, or a range in which the UE_A 10 can move without performing a handover procedure.

In the present embodiment, a TA list is a list including one or more TAs allocated to the UE_A 10 by the network. Note that, while the UE_A 10 is moving within the one or more TAs included in the TA list, the UE_A 10 can move without performing a registration procedure. In other words, the TA list may be an information group indicating an area in which the UE_A 10 can move without performing the registration procedure.

In the present embodiment, a Network Slice is a logical network that provides a specific network capability and a network characteristic. Hereinafter, a network slice will also be referred to as an NW slice.

A Network Slice Instance (NSI) in the present embodiment is an entity of each of one or a plurality of Network Slices configured in the core network_B 190. In addition, the NSI in the present embodiment may include a virtual Network Function (NF) generated using a Network Slice Template (NST). Here, the NST is associated with a resource request for providing a required communication service or capability, and is a logical expression of one or a plurality of Network Functions (NFs). That is, the NSI may be an aggregation including a plurality of NFs in the core network_B 190. In addition, the NSI may be a logical network configured to classify user data delivered through a service or the like. The network slice may include at least one or more NFs. The NF included in the network slice may or may not be an apparatus shared by another network slice. The UE_A 10 and/or an apparatus within a network can be allocated to one or a plurality of network slices, based on NSSAI and/or S-NSSAI and/or UE usage type and/or one or a plurality of network slice type IDs and/or registration information of one or a plurality of NS IDs and/or the APN.

The S-NSSAI in the present embodiment is an abbreviation for Single Network Slice Selection Assistance information, and is information for identifying a network slice. The S-NSSAI may include a Slice/Service type (SST) and a Slice Differentiator (SD). The S-NSSAI may include only an SST or both an SST and an SD. Here, the SST is information indicating an operation of network slices expected in terms of function and service. Also, the SD may be information complementing the SST at a time when one NSI is selected from a plurality of NSIs indicated by the SST. The S-NSSAI may be unique information for each Public Land Mobile Network (PLMN) or may be standard information shared between PLMNs. In addition, the network may store one or a plurality of pieces of S-NSSAI in the registration information of the UE_A 10 as default S-NSSAI.

Single Network Slice Selection Assistance Information (NSSAI) in the present embodiment is a group of S-NSSAI. Each piece of S-NSSAI included in the NSSAI is information assisting the access network or the core network to select an NSI. The UE_A 10 may store the NSSAI allowed from the network for each PLMN. Furthermore, the NSSAI may be information used to select the AMF_A 240.

An operator A network according to the present embodiment is a network operated by a network operator A (operator a). Here, for example, the operator A may deploy a common NW slice that is shared by an operator B which will be described below.

An operator B network according to the present embodiment is a network operated by a network operator B (operator B). Here, for example, the operator B may deploy a common NW slice that is shared by the operator A.

A first NW slice according to the present embodiment is an NW slice to which the established PDU session belongs at a time when the UE connects to a particular DN. Note that, for example, the first NW slice may be an NW slice that is managed within the operator A network, or an NW slice that is commonly managed in the operator B network.

A second NW slice according to the present embodiment is a NW slice to which another PDU session belongs, the PDU session being capable of connecting to the DN serving as a connection destination of the PDU session belonging to the first NW slice. Note that the first NW slice and the second NW slice may be operated by the same operator or may be operated by different operators.

In the present embodiment, an equivalent PLMN refers to a PLMN treated to be the same PLMN as the same HPLMN in the network.

A Dedicated Core Network (DCN) in the present embodiment is one or a plurality of specific subscriber type dedicated core networks included in the core network_A 90. Specifically, a DCN for UE registered as a user of a Machine to Machine (M2M) communication function may be included in the core network_A 90, for example. In addition, a default DCN for UE without a proper DCN may be included in the core network_A 90. Furthermore, in the DCN, at least one or more MMEs_40 or SGSNs_A 42 may be deployed, and further, at least one or more SGWs_A 35, PGWs_A 30, or PCRFs_A 60 may be deployed. Note that, the DCN may be identified with a DCN ID, and further the UE may be allocated to one DCN, based on information such as a UE usage type and/or the DCN ID.

A first timer in the present embodiment is a timer to initiate a procedure for session management, such as a PDU session establishment procedure, and/or to manage transmission of an Session Management (SM) message such as a PDU session establishment request message, and may be information indicating a value of a back-off timer for managing session management behaviors. Hereinafter, the first timer and/or the back-off timer may be referred to as a timer. While the first timer is running, the initiation of the procedure for session management and/or the transmission and/or reception of the SM message of each apparatus may be prohibited. Note that the first timer may be configured to be associated with at least one of a congestion control unit which an NW applies and/or a congestion control unit identified by the UE. For example, the first timer may be configured on at least one of a per APN/DNN basis, and/or a per identification information basis, the identification information indicating one or more NW slices, and/or a per reject cause value basis in a session management procedure, and/or a per session basis, the rejection of the session being indicated in the session management procedure, and/or a per PTI basis in the session management procedure.

Note that an SM message may be an NAS message used in a procedure for session management and may be a control message transmitted and/or received between the UE_A 10 and the SMF_A 230 via the AMF_A 240. Furthermore, the SM message may include a PDU session establishment request message, a PDU session establishment accept message, a PDU session complete message, a PDU session reject message, a PDU session modification request message, a PDU session modification accept message, a PDU session modification reject message, and the like. Furthermore, the session management procedure may include a PDU session establishment procedure, a PDU session modification procedure, and the like. In addition, these procedures may include a back-off timer value for each message received by the UE_A 10. The UE may configure the first timer to a back-off timer received from the NW, may configure the first timer to a timer value in another method, or may configure the first timer to a random value. Alternatively, in a case that a plurality of back-off timers received from the NW are included, the UE may manage a plurality of "first timers" according to the plurality of back-off timers, or may select one timer value from the plurality of back-off timer values received from the NW based on a policy held by the UE to configure the first timer to the one time value and manage the first timer. For example, in a case that two back-off timer values are received, the UE configures "the first timer #1" and "the first timer #2," each to the back-off timer values received from the NW and manage the first timer #1 and the first timer #2. Alternatively, one value may be selected from the plurality of back-off timer values received from the NW based on the policy held by the UE, and the first timer is configured to the one value and managed.

In the case that a plurality of back-off timer values are received from the NW, the UE_A 10 may manage a plurality of "first timers" according to the plurality of back-off timers. Here, to distinguish the plurality of "first timers" received by the UE_A 10, they may be described, for example, as "first timer #1" or "first timer #2." Note that the plurality of back-off timers may be acquired in a single session management procedure, or may be acquired in different session management procedures.

Here, the first timer is configured for a plurality of relevant NW slices based on information for identifying one NW slice as described above, and is configured in units of back-off timers for preventing reconnection or a combination of an APN/DNN and one NW slice, and the first timer may be a back-off timer for preventing reconnection but is not limited thereto. The first timer may be configured in units of combinations of the APN/DNN and a plurality of relevant NW slices based on information for identifying one NW slice, and may be a back-off timer for preventing reconnection.

Re-attempt information in the present embodiment is information by which a network (NW) indicates to the UE_A 10 whether reconnection is allowed using the same identification information in a rejected PDU session. Note that the re-attempt information may be configured for each UTRAN access, E-UTRAN access, NR access, or each piece of slice information. Further, the re-attempt information specified on a per access basis may allow reconnection to the network on the premise of an access change. In the re-attempt information specified on a per slice basis may, slice information on a different slice from a rejected slice is specified, and reconnection using the specified slice information may be allowed.

Network slice association rules in the present embodiment are rules for associating information identifying a plurality of network slices. Note that the network slice association rules may be received in the PDU session reject message or may be preconfigured in the UE_A 10. In addition, for the network slice association rules, the latest ones for the UE_A 10 may be applied. Conversely, the UE_A 10 may behave based on the latest network slice association rules. For example, in a case that the UE_A 10 receives new network slice association rules in the PDU session reject message with the network slice association rules preconfigured in the UE_A 10, the UE_A 10 may update the network slice association rules held in the UE_A 10.

Priority management rules of the back-off timer in the present embodiment are rules configured in the UE_A 10 to collectively manage a plurality of back-off timers that have occurred in a plurality of PDU sessions on a single back-off timer. For example, in a case that conflicting or overlapping congestion control is applied and the UE holds a plurality of back-off timers, the UE_A 10 may collectively manage the plurality of back-off timers based on the priority management rules of the back-off timers. Note that a pattern in which conflicting or overlapping congestion control occurs is a case that congestion control based only on a DNN and congestion control based both on the DNN and slice information are applied at the same time, and in this case, congestion control based only on the DNN is prioritized.

Note that priority management rules of the back-off timers may not be limited to the above. Note that the back-off timers may be a first timer included in the PDU session reject message.

A first state in the present embodiment is a state in which each apparatus has completed the registration procedure and the PDU session establishment procedure, and the UE_A 10 and/or each apparatus is in a state in which one or more of the congestion controls from the first to the fourth congestion control have been applied. Here, the UE_A 10 and/or each apparatus may be in a state in which the UE_A 10 has been registered in the network (the RM-REGISTERED state) after the completion of the registration procedure, and the state in which the PDU session establishment procedure has been completed may be a state in which the UE_A 10 has received the PDU session establishment reject message from the network.

The congestion control in the present embodiment includes one or more congestion controls of the congestion controls from the first to the fourth congestion control. Note that the control of the UE by the NW is achieved by congestion control recognized by the first timer and the UE, and the UE may store association of information of them.

The first congestion control in the present embodiment indicates control signal congestion control directed to parameters of the DNN. For example, in a case that congestion on a DNN #A is detected on an NW and the NW recognizes it as a UE-initiated session management request directed to parameters only of the DNN #A, the NW can apply the first congestion control. Note that even in a case that the UE-initiated session management request does not include DNN information, the default DNN may be selected and initiated by the NW for congestion control. Alternatively, even in a case that the NW recognizes congestion as a UE-initiated session management request including the DNN #A and S-NSSAI #A, the NW may apply the first congestion control. In the case that the first congestion control is applied, the UE may prevent the UE-initiated session management request directed only to the DNN #A.

In other words, the first congestion control in the present embodiment is control signal congestion control directed to the DNN, and congestion control caused by connectivity to the DNN in a congested state. For example, the first congestion control may be congestion control to restrict connection to the DNN #A in all types of connectivity. Here, the connection to the DNN #A in all types of connectivity may be a connection to the DNN #A in connectivity using all types of S-NSSAI available for the UE, and may be a connection to the DNN #A through a network slice to which the UE can connect. Furthermore, connectivity to the DNN #A without passing through a network slice may be included.

The second congestion control in the present embodiment indicates control signal congestion control directed to parameters of S-NSSI. For example, in a case that control signal congestion with respect to S-NSSAI #A is detected on an NW and the NW recognizes it as a UE-initiated session management request directed only to the parameters of the S-NSSAI #A, the NW may apply the second congestion control. In the case that the second congestion control is applied, the UE may prevent the UE-initiated session management request directed only to the S-NSSAI #A.

In other words, the first congestion control in the present embodiment is control signal congestion control directed to the S-NSSAI and may be congestion control caused by a network slice selected based on the S-NSSAI in a congested state. For example, the second congestion control may be congestion control to restrict all connections based on the S-NSSAI #A. That is, it may be congestion control to restrict all connections to the DNN via a network slice selected based on the S-NSSAI #A.

The third congestion control in the present embodiment indicates control signal congestion control directed to parameters of the DNN and the S-NSSAI. For example, in a case that control signal congestion with respect to the DNN #A and control signal congestion with respect to the S-NSSAI #A are detected at the same time on an NW and the NW recognizes it as a UE-initiated session management request directed to the parameters of the DNN #A and the S-NSSAI #A, the NW may apply the third congestion control. Note that, even in a case that the UE-initiated session management request does not include information indicating the DNN, NW-initiated selection of a default DNN may be performed and the default DNN may also be subjected to the congestion control. In the case that the third congestion control is applied, the UE may prevent the UE-initiated session management request directed to the parameters of the DNN #A and the S-NSSAI #A.

In other words, the third congestion control in the present embodiment is control signal congestion control directed to the parameters of the DNN and the S-NSSAI and may be congestion control caused by connectivity to the DNN via a network slice selected based on the S-NSSAI in a congested state. For example, the third congestion control may be congestion control to restrict a connection to the DNN #A in connectivity based on the S-NSSAI #A.

The fourth congestion control in the present embodiment indicates control signal congestion control directed to at least one parameter of the DNN and/or the S-NSSAI. For example, in a case that control signal congestion with respect to the DNN #A and control signal congestion with respect to the S-NSSAI #A are detected at the same time on an NW and the NW recognizes it as a UE-initiated session management request directed to at least one parameter of the DNN #A and/or the S-NSSAI #A, the NW may apply the fourth congestion control. Note that, even in a case that the UE-initiated session management request does not include information indicating the DNN, NW-initiated selection of a default DNN may be performed and the default DNN may also be subjected to the congestion control. In the case that the fourth congestion control is applied, the UE may prevent the UE-initiated session management request directed to at least one parameter of the DNN #A and/or the S-NSSAI #A.

In other words, the fourth congestion control in the present embodiment is control signal congestion control directed to the parameters of the DNN and the S-NSSAI and may be congestion control caused by connectivity to the DNN via a network slice selected based on the S-NSSAI in a congested state. For example, the fourth congestion control may be congestion control to restrict all connections based on the S-NSSAI #A and congestion control to restrict a connection to the DNN #A in all types of connectivity. That is, it may be congestion control to restrict all connections to the DNN via a network slice selected based on the S-NSSAI #A and may be congestion control to restrict a connection to the DNN #A in all types of connectivity. Here, the connection to the DNN #A in all types of connectivity may be a connection to the DNN #A in connectivity using all types of S-NSSAI available for the UE, and may be a connection to the DNN #A through a network slice to which the UE can connect. Furthermore, connectivity to the DNN #A without passing through a network slice may be included.

Thus, the fourth congestion control having the DNN #A and the S-NSSAI #A as parameters may be congestion control in which the first congestion control having the DNN #A as a parameter and the second congestion control having the S-NSSAI #A as a parameter are simultaneously performed.

A first behavior in the present embodiment is a behavior of storing, by the UE, slice information transmitted in a first PDU session establishment request message in association with transmitted PDU session identification information. In the first behavior, the UE may store the slice information transmitted in the first PDU session establishment request message or may store the slice information received at a time when the first PDU session establishment request is rejected.

A second behavior in the present embodiment is a behavior of transmitting, by the UE, a PDU session establishment request to connect to the same APN/DNN as the first PDU session establishment request using another piece of slice information different from the slice information specified in the first PDU session establishment. Specifically, the second behavior may be, in a case that a back-off timer value the UE receives from a network is zero or invalid, a behavior of transmitting, by the UE, a PDU session establishment request to connect to the same APN/DNN as the first PDU session establishment request using another piece of slice information different from the slice information specified in the first PDU session establishment. Alternatively, in a case that the first PDU session is rejected because radio access of a specific PLMN to which the specified APN/DNN is connected is not supported, or in a case that a first PDU session is rejected because of a temporary cause, it may be a behavior of transmitting, by the UE, the PDU session establishment request to connect to the same APN/DNN as the APN/DNN included in the first PDU session establishment request using the slice information different from the slice information specified in the first PDU session establishment.

A third behavior in the present embodiment is a behavior of transmitting, by the UE, a new PDU session establishment request using the same identification information until the first timer expires at a time when the PDU session establishment request is rejected. Specifically, the third behavior may be a behavior of transmitting, by the UE, no new PDU session establishment request using the same identification information until the first timer expires in a case that a back-off timer value received from the network is neither zero nor invalid. Alternatively, in a case that another PLMN is selected or another NW slice is selected, a reject cause for a configuration failure for network operations is received, and a back-off timer has been activated at a time when the first PDU session establishment request is rejected, it may be a behavior of transmitting no new PDU session establishment request using the same identification information until the first timer expires.

In more detail, a PDU session of which a new PDU session establishment request in the third behavior is not transmitted may be a PDU session to which congestion control associated with the first timer is applied. More specifically, the third behavior may be a behavior of transmitting no new PDU session establishment request of a PDU session, the PDU session being connectivity depending on a type of congestion control associated with the first timer and using the DNN and/or the S-NSSAI associated with the congestion control. Note that processing of the UE to be prohibited by the present behavior may be an initiation of a procedure for session management including a PDU session establishment request and/or transmission and/or reception of an SM message.

A fourth behavior in the present embodiment is a behavior of transmitting, by the UE, no new PDU session establishment request that does not carry slice information and DNN/APN information until the first timer expires at a time when a PDU session establishment request carried and transmitted in a Registration procedure is rejected. Specifically, the fourth behavior may be a behavior of transmitting, by the UE, no new PDU session establishment request that does not carry the slice information and the DNN/APN until the first timer expires in a case that a back-off timer value received from the network is neither zero nor invalid.

The fifth behavior in the present embodiment is a behavior of transmitting, by the UE, no new PDU session establishment request using the same identification information at a time when the PDU session establishment request is rejected. Specifically, the fifth behavior may be a behavior of transmitting, by the UE, no new PDU session establishment request using the same identification information in a case that the UE is an equivalent PLMN at a time when PDP types supported by the UE and the network are different.

A sixth behavior in the present embodiment is a behavior of transmitting, by the UE, at a time when the PDU session establishment request is rejected, a new PDU session establishment request as an initial procedure using the same identification information. Specifically, the sixth behavior may be a behavior of transmitting, by the UE, a new PDU session establishment request as an initial procedure using the same identification information in a case that a first PDU session establishment request is rejected because there is no target PDN session context in handover from non-3 GPP access.

A seventh behavior in the present embodiment is a behavior of continuing, by the UE, in a case that another NW slice is selected in a procedure for selecting the PLMN, a back-off timer received at a time when the previous PDU session establishment request was rejected. Specifically, the seventh behavior is a behavior of continuing, by the UE, a back-off timer received at a time when the first PDU session establishment request was rejected in a case that a PLMN is selected at a time when the first PDU session establishment request is rejected and that a common NW slice can be specified that is a NW slice specified in the first PDU session establishment request in the selected PLMN.

An eighth behavior in the present embodiment is a behavior of configuring, by the UE, a value notified from a network or a value preconfigured in the UE as a first timer value. Specifically, the eighth behavior may be a behavior of configuring, by the UE, the first timer value to the back-off timer value received in the rejection notification in response to the first PDU session establishment request, or may be a behavior of configuring the first timer value to a value configured or held in the UE in advance. Note that, a case of configuring the first timer value to a timer configured or held in the UE in advance, may be applied only at a time when the serving network is the HPLMN or the equivalent PLMN.

A ninth behavior in the present embodiment is a behavior of transmitting, by the UE, no new PDU session establishment request until the terminal power is turned on/off or a Universal Subscriber Identity Module (USIM) is inserted/removed at a time when the PDU session establishment request is rejected. Specifically, in the ninth behavior, the UE does not transmit a new PDU session establishment request until the terminal power is turned on/off or the USIM is inserted/removed in a case that a back-off timer received from a network is invalid or the first PDU session reject cause is difference in PDP type between the UE and the network. Alternatively, in a case that the first PDU session is rejected because the designated APN/DNN is not supported wirelessly by a connected PLMN and there is no information element of the back-off timer from the network, and there is no Re-attempt information or PDU session reconnection to an equivalent PLMN is allowed, it may be a behavior of transmitting no new PDU session establishment request until the terminal power is turned on/off or the USIM is inserted/removed in the connected PLMN. Alternatively, in a case that the first PDU session is rejected because the specified APN/DNN is not supported wirelessly by the connected PLMN, and there is no information element of the back-off timer from the network, there is no Re-attempt information, or PDU session reconnection to the equivalent PLMN is not allowed, it may be a behavior of transmitting no new PDU session establishment request until the terminal power is turned on/off or the USIM is inserted/removed in the connected PLMN. Alternatively, in a case that the first PDU session is rejected because the specified APN/DNN is not supported wirelessly by a connected PLMN and the back-off timer from the network is neither zero nor invalid, it may be a behavior of transmitting no new PDU session establishment request until the terminal power is turned on/off or the USIM is inserted/removed. Alternatively, in a case that the first PDU session is rejected because the specified APN/DNN is not supported wirelessly by the connected PLMN and the back-off timer from the network is invalid, it may be a behavior of transmitting no new PDU session establishment request until the terminal power is turned on/off or the USIM is inserted/removed.

A tenth behavior in the present embodiment is a behavior of transmitting, by the UE, a new PDU session establishment request at a time when a PDU session establishment request is rejected. Specifically, the tenth behavior may be a behavior of transmitting, by the UE, in a case that the back-off timer received from the network is zero or the first PDU session establishment request is rejected because of a temporary cause and further there is no back-off timer information element notified from the network, a new PDU session establishment request. Alternatively, in a case that another PLMN is selected or another NW slice is selected, the first PDU session establishment request is rejected because of a temporary cause, the back-off timer has not started for a target APN/DNN on the selected PLMN, or the back-off timer received from the network is invalid, it may be a behavior of transmitting a new PDU session establishment request. Alternatively, in a case that the first PDU session establishment request is rejected due to different PDP types of the UE and the network, and that Re-attempt information is not received at a time when a different PLMN is selected or a PLMN that is not in an equivalent PLMN list is selected, or a PDP type is changed, or the terminal power is turned on/off or the USIM is inserted/removed, it may be a behavior of transmitting a new PDU session establishment request. Alternatively, in a case that the first PDU session is rejected because the specified APN/DNN is not supported wirelessly by the connected PLMN and the back-off timer notified from the network is zero, it may be a behavior of transmitting a new PDU session establishment request.

An 11th behavior in the present embodiment is a behavior of ignoring, by the UE, the first timer and the Re-attempt information. Specifically, the 11th behavior may be a behavior of ignoring, by the UE, the first timer and the Re-attempt information in a case that the first PDU session establishment request is rejected because there is no target PDN session context in handover from non-3 GPP access, or the first PDU session establishment is rejected because the number of bearers submitted in the PDN connection reaches a maximum number.

A 12th behavior in the present embodiment is a behavior of determining, by the UE, information for identifying a plurality of relevant NW slices based on information for identifying one NW slice received in the rejection notification in response to the first PDU session establishment request and preventing, by the UE, reconnection to the plurality of relevant NW slices based on information for identifying one NW slice. Specifically, the 12th behavior may be a behavior of deriving, by the UE, information for identifying another NW slice relevant to information for identifying an NW slice notified in the rejection in response to the first PDU session establishment request based on network slice associated rules. Note that the network slice associated rules may be preconfigured in the UE or may be notified from the network in a rejection notification regarding the PDU session establishment.

A 13th behavior in the present embodiment may be a behavior of managing, by the UE, a timer based on priority management rules for back-off timers in a case that a plurality of different congestion controls are activated for one or a plurality of PDU session establishments by the same UE and a plurality of timers are provided from the network. For example, the first PDU session establishment request for a combination of a DNN_1 and a slice_1 by the UE is subjected to congestion control based on both a DNN and slice information, and the UE receives a first timer #1. In addition, the UE makes a second PDU session establishment request for a combination of the DNN_1 and a slice_2, is subjected to congestion control based solely on the DNN, and receives a first timer #2. At this time, the UE may manage a behavior of PDU session re-establishment of the UE using the dominant first timer #2, based on the priority management rules for the back-off timers. Specifically, a timer value held by the UE may be overwritten with a timer value generated by prioritized congestion control.

A 14th behavior in the present embodiment may be a behavior of managing a timer for each session management instance (on a per PDU session basis) in a case that a plurality of different congestion controls are applied to one or a plurality of PDU session establishments by the same UE and a plurality of timers are provided from the network. For example, in a case that the first PDU session establishment of the combination of the DNN #1 and the slice #1 by the UE is subjected to congestion based on both the DNN and slice information, the UE manages a target back-off timer value as the first timer #1. Thereafter, in a case that the UE further attempts to establish a PDU session for a combination of the DNN #1 and a slice #2 as a second PDU session and is subjected to congestion based only on the DNN, the UE manages the target back-off timer value as the first timer #2. At this time, the UE simultaneously manages a plurality of timers (here, the first timer #1 and the first timer #2). Specifically, the UE manages the timer on a per session management instance/PDU session. Alternatively, in a case that the UE receives a plurality of timers simultaneously in one session management procedure, the UE simultaneously manages the target back-off timer on a congestion control unit basis identified by the UE.

A 15th behavior in the present embodiment may be a behavior of performing, by the UE_A 10, first identification process to identify which type of congestion control to apply among the congestion controls from the first congestion control to the fourth congestion control and second identification process to identify the DNN and/or the S-NSSAI associated with the congestion control to be applied. Note that the first identification process may be identified based on at least one piece of identification information from the first identification information to the fourth identification information and/or at least one piece of identification information from 11th identification information to 18th identification information. Similarly, the second identification process may be identified based on at least one piece of identification information from the first identification information to the fourth identification information and/or at least one piece of identification information from the 11th identification information to the 18th identification information.

An example of first identification process will be described below. In the first identification process, the type of congestion control applied in a case that any one of or two or more combinations of the following cases are met may be identified as first congestion control.

- A case that at least 15th identification information is a value corresponding to the first congestion control.
- A case that at least 16th identification information is a value corresponding to the first congestion control.
- A case that at least 14th identification information includes information indicating the first congestion control.
- A case that at least 17th identification information includes only the DNN and does not include the S-NSSAI.
- In a case that the 16th identification information is information for identifying the identification information in any of the first congestion control and the second congestion control and is information in which only a value corresponding to the second congestion control is configurable for the 16th identification information, a case that at least the 16th identification information is not received.
- In a case that the 16th identification information is information for identifying the identification information in any of the first congestion control and the fourth congestion control and is information in which only a value corresponding to the fourth congestion control is configurable for the 16th identification information, a case that at least the 16th identification information is not received.
- In a case that the 16th identification information is information for identifying the identification information in any of the first congestion control, the second congestion control, and the fourth congestion control and is information in which only a value corresponding to the second congestion control and a value corresponding to the fourth congestion control are configurable for the 16th identification information, a case that at least the 16th identification information is not received.

However, the present embodiment is not limited to the example described above, and the UE_A 10 may perform the identification based on one or more pieces of identification information from the first identification information to the fourth identification information, and/or at least one piece of identification information from the 11th identification information to the 18th identification information, or a combination of two or more pieces of identification information.

In the first identification process, the type of congestion control to apply in a case that any one or two or more combinations of the following cases are met may be identified as second congestion control.

- A case that at least the 15th identification information is a value corresponding to the second congestion control.

A case that at least the 16th identification information is a value corresponding to the second congestion control.

A case that at least the 14th identification information includes information indicating the second congestion control.

A case that at least the 17th identification information includes only the S-NSSAI and does not include the DNN.

In a case that the 16th identification information is information for identifying the identification information in any of the first congestion control and the second congestion control and is information in which only a value corresponding to the first congestion control is configurable for the 16th identification information, a case that at least the 16th identification information is not received.

In a case that the 16th identification information is information for identifying the identification information in any of the second congestion control and the third congestion control and is information in which only a value corresponding to the third congestion control is configurable for the 16th identification information, a case that at least the 16th identification information is not received.

In a case that the 16th identification information is information for identifying the identification information in any of the second congestion control, the third congestion control, and the fourth congestion control and is information in which only a value corresponding to the third congestion control and a value corresponding to the fourth congestion control are configurable for the 16th identification information, a case that at least the 16th identification information is not received.

However, the present embodiment is not limited to the example described above, and the UE_A 10 may perform the identification based on one or more pieces of identification information from the first identification information to the fourth identification information, and/or at least one piece of identification information from the 11th identification information to the 18th identification information, or a combination of two or more pieces of identification information.

In the first identification process, the type of congestion control to apply in a case that any one or two or more combinations of the following cases are met may be identified as third congestion control.

A case that at least the 15th identification information is a value corresponding to the third congestion control.

A case that at least the 16th identification information is a value corresponding to the third congestion control.

A case that at least the 14th identification information includes information indicating the third congestion control.

A case that at least the 15th identification information is a value corresponding to a plurality of congestion controls including the third congestion control and not including the fourth congestion control, and the S-NSSAI and the DNN are included in the 17th identification information.

In a case that the 16th identification information is information for identifying the identification information in any of the third congestion control and the fourth congestion control and is information in which only a value corresponding to the fourth congestion control is configurable for the 16th identification information, a case that at least the 16th identification information is not received.

In a case that the 16th identification information is information for identifying the identification information in any of the second congestion control and the third congestion control and is information in which only a value corresponding to the second congestion control is configurable for the 16th identification information, a case that at least the 16th identification information is not received.

In a case that the 16th identification information is information for identifying the identification information in any of the second congestion control, the third congestion control, and the fourth congestion control and is information in which only a value corresponding to the second congestion control and a value corresponding to the fourth congestion control are configurable for the 16th identification information, a case that at least the 16th identification information is not received.

However, the present embodiment is not limited to the example described above, and the UE_A 10 may perform the identification based on one or more pieces of identification information from the first identification information to the fourth identification information, and/or at least one piece of identification information from the 11th identification information to the 18th identification information, or a combination of two or more pieces of identification information.

In the first identification process, the type of congestion control to apply in a case that any one or two or more combinations of the following cases are met may be identified as the fourth congestion control.

A case that at least the 15th identification information is a value corresponding to the fourth congestion control.

A case that at least the 16th identification information is a value corresponding to the fourth congestion control.

A case that at least the 14th identification information includes information indicating the fourth congestion control.

A case that at least the 15th identification information is a value corresponding to a plurality of congestion controls including the fourth congestion control and not including the third congestion control, and the S-NSSAI and the DNN are included in the 17th identification information.

In a case that the 16th identification information is information for identifying the identification information in any of the third congestion control and the fourth congestion control and is information in which only a value corresponding to the third congestion control is configurable for the 16th identification information, a case that at least the 16th identification information is not received.

In a case that the 16th identification information is information for identifying the identification information in any of the second congestion control and the fourth congestion control and is information in which only a value corresponding to the second congestion control is configurable for the 16th identification information, a case that at least the 16th identification information is not received.

In a case that the 16th identification information is information for identifying the identification information in any of the first congestion control and the fourth congestion control and is information in which only a value corresponding to the first congestion control is configurable for the 16th identification information, a case that at least the 16th identification information is not received.

In a case that the 16th identification information is information for identifying the identification information in any of the second congestion control, the third congestion control, and the fourth congestion control and is information in which only a value corresponding to the second congestion control and a value corresponding to the third congestion control are configurable for the 16th identification information, a case that at least the 16th identification information is not received.

In a case that the 16th identification information is information for identifying the identification information in any of the first congestion control, the second congestion control, and the fourth congestion control and is information in which only a value corresponding to the first congestion control and a value corresponding to the second congestion control are configurable for the 16th identification information, a case that at least the 16th identification information is not received.

However, the present embodiment is not limited to the example described above, and the UE_A 10 may perform the identification based on one or more pieces of identification information from the first identification information to the fourth identification information, and/or at least one piece of identification information from the 11th identification information to the 18th identification information, or a combination of two or more pieces of identification information or perform the identification using another means.

As described above, a type of congestion control may be identified in the first identification process.

Next, an example of a second identification process will be described. Note that the second identification process may be a process of identifying a corresponding DNN and/or S-NSSAI for a type of congestion control identified in the first identification process.

More specifically, the DNN corresponding to the first congestion control, the third congestion control, and the fourth congestion control may be determined based on 12th identification information. Additionally/alternatively, the DNN corresponding to the first congestion control, the third congestion control, and the fourth congestion control may be determined based on the 17th identification information. Additionally/alternatively, the DNN corresponding to the first congestion control, the third congestion control, and the fourth congestion control may be determined based on the second identification information.

Thus, the DNN corresponding to the first congestion control, the third congestion control, and the fourth congestion control may be the DNN indicated by the 12th identification information. Additionally/alternatively, the DNN corresponding to the first congestion control, the third congestion control, and the fourth congestion control may be a DNN included in the 17th identification information. Additionally/alternatively, the DNN corresponding to the first congestion control, the third congestion control, and the fourth congestion control may be a DNN indicated by the second identification information.

Also, an S-NSSAI corresponding to the second congestion control, the third congestion control, and the fourth congestion control may be determined based on the 17th identification information. Additionally/alternatively, the DNN corresponding to the first congestion control, the third congestion control, and the fourth congestion control may be determined based on the first identification information.

Thus, the DNN corresponding to the first congestion control, the third congestion control, and the fourth congestion control may be an S-NSSAI indicated by the 17th identification information. Additionally/alternatively, the DNN corresponding to the first congestion control, the third congestion control, and the fourth congestion control may be an S-NSSAI included in the first identification information.

However, the present embodiment is not limited to the example described above, and the UE_A 10 may perform the identification based on one or more pieces of identification information from the first identification information to the fourth identification information, and/or at least one piece of identification information from the 11th identification information to the 18th identification information, or a combination of two or more pieces of identification information or perform the identification using another means.

Based on the above 15th behavior, the UE_A 10 may identify a congestion control to be applied to the UE_A 10 by the core network_B 190. In other words, the UE_A 10 may identify the corresponding type of congestion control and the corresponding S-NSSAI and/or DNN as congestion control to be applied based on the 15th behavior. Note that the UE_A 10 may store and manage one or more pieces of identification information from the first identification information to the fourth identification information and from the 11th identification information to the 18th identification information in association with the congestion control to be applied. Here, the third identification information, and/or the fourth identification information, and/or the 13th identification information may be stored and managed as information for identifying the congestion control to be applied.

A 16th behavior in the present embodiment is a behavior of stopping the first timer, by the UE, in a case that the NW-initiated session management procedure is performed with the first timer activated.

Here, for example, in a case that a plurality of first timers have been activated, it may be a behavior of determining a first timer to be stopped and stopping it among the plurality of first timers activated based on 21st identification information. And/or it may be a behavior of stopping a first timer associated with congestion control identified by a 17th behavior. Note that in a case that there is a plurality of congestion controls identified by the 17th behavior, a timer associated with each congestion control may be stopped.

The 17th behavior in the present embodiment may be a behavior of identifying, by the UE, congestion control of which application is to be stopped among one or more congestion controls that the UE is applying based on the reception of a control message transmitted by the core network. For example, the UE may identify a congestion control whose application is to be stopped or changed based on the 21st identification information.

Specifically, as described above, the UE stores the third identification information, and/or the fourth identification information, and/or the 13th identification information in the fourth process as information for identifying a congestion control, and may identify a congestion control, as the congestion control of which application is to be stopped, in a case that the information for identifying the congestion control matches the 13th identification information included in the 21th identification information.

Additionally/alternatively, the UE may identify a congestion control whose application is to be stopped based on one piece or a combination of a plurality of pieces of identification information from the 11th identification information to the 18th identification information included in the 21st identification information. Here, details of the identification method may be the same as the identification process in the 15th behavior described in the fourth process in the example of the PDU session establishment procedure described below. That is, the UE may identify the congestion control to be stopped in a similar method to the method of identifying the congestion control to be applied.

Note that the UE may identify a plurality of congestion controls whose application is to be stopped. Hereinafter, the congestion control identified by the method described above is considered to be a first congestion control, and a method of identifying a second congestion control that is different from the first congestion control will be described.

For example, the UE may identify, as the second congestion control, congestion control associated with the same DNN as the DNN associated with the first congestion control. Additionally/alternatively, the UE may identify a congestion control associated with the same S-NSSAI as the S-NSSAI associated with the first congestion control as the second congestion control. Note that identifying a plurality of congestion controls whose application is to be stopped may be configured to be performed only in a case that the first congestion control and/or the second congestion control is a specific type of congestion control.

Specifically, in a case that the first congestion control is any of the first congestion control to the fourth congestion control, the UE may identify the second congestion control. Additionally/alternatively, in specifying the second congestion control, the UE may identify the second congestion control in a case that congestion control to be searched is any of the first congestion control to the fourth congestion control. Note that the type of the plurality of congestion controls that the first congestion control and/or the second identification information can identify may be preconfigured in a core network and/or the UE. Note that the number of specific types of congestion control for which identification is allowed is not necessarily one, and a plurality of specific types may be configured.

The first identification information in the present embodiment is information for identifying a session belonging to a first NW slice. In other words, the first identification information may be information indicating that the UE supports establishment of a PDU session belonging to the first NW slice. Specifically, for example, the first identification information can be information for identifying the first NW slice. Note that the slice information may be identification information indicating a specific S-NSSAI. Note that the first identification information may be information for identifying a specific NW slice in the operator A network, or may be information for identifying an identical NW slice also shared by the operator B (an operator other than the operator A). Furthermore, the first identification information may be information for identifying the first NW slice configured from an HPLMN, may be information for identifying the first NW slice obtained from the AMF in a registration procedure, or may be information for identifying the first NW slice granted from a network. In addition, the first identification information may be information for identifying the first NW slice stored for each PLMN.

Second identification information in the present embodiment may be Data Network Name (DNN) and information used to identify a Data Network (DN).

Third identification information in the present embodiment may be a PDU session ID and information used to identify a PDU Session.

Fourth identification information in the present embodiment is a Procedure transaction identity (PTI), which may be information for identifying transmission and/or reception of a series of messages of a specific session management procedure as a single group, and further may be information used to identify and/or distinguish transmission and/or reception of another series of session management-related messages.

11th identification information in the present embodiment may be information indicating rejection of a request for PDU session establishment or a request for a PDU session modification. Note that the request for PDU session establishment or the request for PDU session modification is a request performed by the UE, and a DNN and/or an S-NSSAI is included. That is, the 11th identification information may be information indicating that an NW rejects a request for PDU session establishment or a request for PDU session modification corresponding to the DNN and/or the S-NSSA.

In addition, an NW may transmit at least one identification information of 12th identification information to 18th identification information along with 11th identification information to the UE to indicate congestion control to the UE. In other words, the NW may notify the UE of congestion control corresponding to one piece or a combination of a plurality of pieces of identification information from the 12th identification information to the 18th identification information. On the other hand, the UE may identify a congestion control corresponding to one piece or a combination of a plurality of pieces of identification information from the 12th identification information to the 18th identification information to perform processing based on the identified congestion control. Specifically, the UE may start counting of the first timer associated with the identified congestion control. Note that a timer value of the first timer may be determined using 14th identification information, a timer value configured in another method such as using a value stored by the UE in advance may be configured, or a random value may be configured.

The 12th identification information in the present embodiment may be a DNN, which may be a DNN that is not allowed by the network, or may be information indicating that a DNN identified with the second identification information is not allowed. In addition, the 12th identification information may be the same DNN as that of the second identification information.

The 13th identification information in the present embodiment may be a PDU Session ID and/or PTI that is a PDU session ID and/or PTI not allowed by the network, or may be information indicating that a PDU session ID and/or PTI identified with the third identification information is not allowed. Furthermore, the PDU Session ID of the 13th identification information may be the same PDU session ID as that of the third identification information. Additionally, the PTI of the 13th identification information may be the same PTI as that of the fourth identification information.

Here, the 13th identification information may be used as information for identifying congestion control of which the NW notifies the UE based on the rejection of the PDU session establishment. In other words, the UE may store and manage the 13th identification information in association with congestion control performed based on the 15th behavior and use the 13th identification information as information for identifying the performed congestion control. Note that the information for identifying the congestion control may be constituted by a combination of one or more pieces of identification information from the 14th to the 18th identification information in addition to the 13th identification information.

The 14th identification information in the present embodiment may be information indicating a value of a back-off timer. In other words, the back-off timer may be a value indicating a validity period of congestion control of which the NW notifies the UE based on the rejection of the PDU session establishment. In other words, the UE may use the 14th identification information as a timer value in the 15th behavior performed according to reception of the 14th identification information. Furthermore, the 14th identification information may include information for identifying a type of congestion control in addition to the timer value. Specifically, information for identifying a congestion control among the congestion controls from the first congestion control to the fourth congestion control may be included. For example, the information identifying a type of congestion control may be a timer name by which each congestion control operation is identified or may be a flag by which each congestion control operation is identified. congestion control may be identified using another method, such as identified with a location stored in a control message, and the like, without being limited to the above.

The 15th identification information in the present embodiment is information indicating one or more Cause Values indicating a cause for which the present procedure has been rejected. In other words, a cause value may be information indicating congestion control applied by the NW to the present procedure.

Note that a cause value may be information for identifying a congestion control among the congestion controls from the first congestion control to the fourth congestion control the congestion control that the NW notifies the UE indicates based on the rejection of the PDU session establishment. In this case, for each congestion control from the first congestion control to the fourth congestion control, the NW may transmit a different value to the UE as a cause value. The UE may interpret each value transmitted as a cause value in advance, and identify, in the 15th behavior based on at least the 15th identification information, a congestion control among the congestion controls from the first congestion control to the fourth congestion control.

Alternatively, the cause value may be information for identifying whether the congestion control of which the NW notifies the UE based on the rejection of the PDU session establishment is the first congestion control, or any congestion control among the second congestion control, the third congestion control, and the fourth congestion control. In this case, the NW may transmit different values to the UE as cause values depending on whether the congestion control is the first congestion control or any congestion control of the second congestion control, the third congestion control, and the fourth congestion control. The UE may interpret each value transmitted as a cause value in advance, and identify, in the 15th behavior based on at least the 15th identification information, whether the congestion control is the first congestion control or any of the second congestion control, the third congestion control, and the fourth congestion control.

Alternatively, the cause value may be information for identifying whether the congestion control of which the NW notifies the UE based on the rejection of the PDU session establishment is the first congestion control, the second congestion control, or any congestion control of the third congestion control and the fourth congestion control. In this case, the NW may transmit different values to the UE as cause values depending on whether the congestion control is the first congestion control, the second congestion control, or any congestion control of the third congestion control and the fourth congestion control. The UE may interpret each value transmitted as a cause value in advance, and identify, in the 15th behavior based on at least the 15th identification information, whether the congestion control is the first congestion control, the second congestion control, or any of the third congestion control and the fourth congestion control.

Alternatively, the cause value may be information for identifying whether the congestion control of which the NW notifies the UE based on the rejection of the PDU session establishment is the first congestion control or the second congestion control, or the third congestion control or the fourth congestion control. In this case, the NW may transmit different values to the UE as cause values depending on whether the congestion control is the first congestion control or the second congestion control, or the third congestion control or the fourth congestion control. The UE may interpret each value transmitted as a cause value in advance, and identify, in the 15th behavior based on at least the 15th identification information, whether the congestion control is the first congestion control or the second congestion control, or the third congestion control or the fourth congestion control.

Alternatively, the cause value may be information for identifying whether congestion control of which the NW notifies the UE based on the rejection of the PDU session establishment is the second congestion control or the third congestion control, or the first congestion control or the fourth congestion control. In this case, the NW may transmit different values to the UE as cause values depending on whether the congestion control is the second congestion control or the third congestion control, or the first congestion control or the fourth congestion control. The UE may interpret each value transmitted as a cause value in advance, and identify, in the 15th behavior based on at least the 15th identification information, whether the congestion control is the second congestion control or the third congestion control, or the first congestion control or the fourth congestion control.

Alternatively, the cause value may be information for identifying whether the congestion control of which the NW notifies the UE based on the rejection of the PDU session establishment is the second congestion control or the fourth congestion control, or the first congestion control or the third congestion control. In this case, the NW may transmit different values to the UE as cause values depending on whether the congestion control is second congestion control or the fourth congestion control, or the first congestion control or the third congestion control. The UE may interpret each value transmitted as a cause value in advance, and identify, in the 15th behavior based on at least the 15th identification information, whether the congestion control is the second congestion control or the fourth congestion control, or the first congestion control or the third congestion control.

Alternatively, the cause value may be information indicating that the NW performs congestion control for the UE based on the rejection of the PDU session establishment. In other words, the cause value may be information for causing the UE to perform any of the first congestion control to the fourth congestion control. In this case, the cause value may not be information with which specific congestion control can be identified.

Note that, in the present embodiment, in a case that the third congestion control is not performed, the implication corresponding to the third congestion control is unnecessary in the cause value of the 15th identification information described above, and a process, description, and implication of the third congestion control may be omitted from the description of the cause value of the 15th identification information described above. Furthermore, in the present embodiment, in a case that the fourth congestion control is not performed, the implication corresponding to the fourth congestion control is unnecessary in the cause value of the 15th identification information described above, and a process, description, and implication of the fourth congestion control may be omitted from the description of the cause value of the 15th identification information described above.

16th identification information in the present embodiment is one or more pieces of Indication information indicating that the present procedure has been rejected. In other words, the Indication information may be information indicating congestion control applied to the present procedure by the NW. The NW may indicate congestion control applied by the NW based on the 16th identification information.

For example, the Indication information may be information indicating which congestion control the NW restricts with respect to the UE in two or more congestion controls among the congestion controls from the first congestion control to the fourth congestion control. Thus, the NW may transmit a value associated with restrictive management to be applied to the UE as Indication information. The UE may interpret each value transmitted as Indication information in advance, and identify, in the 15th behavior based on at least the 16th identification information, a congestion control among the congestions controls from the first congestion control to the fourth congestion control. Here, the two or more congestion controls among the congestion controls from the first congestion control to the fourth congestion control is congestion control identifiable using the Indication information, and the congestion control to be identified may be all four congestion controls, may be the first congestion control and the second congestion control, may be the third congestion control and the fourth congestion control, may be the second congestion control to the fourth congestion control, or any other combination thereof.

Note that the Indication information does not necessarily require values respectively corresponding to all of the congestion controls to be identified. For example, in a case that values of the Indication information are respectively associated with and allocated to the congestion controls excluding congestion control A, the value of the Indication information may not necessarily be configured for the congestion control A. In this case, the NW and the UE can identify the first congestion control because the Indication information is not transmitted and/or received. Note that the congestion control A may be any congestion control among the first congestion control to the fourth congestion control.

In addition, at a time when the UE is notified of congestion control based on transmission of a PDU session establishment reject message, there may be cases that Identification is included and not included depending on a type of congestion control from the first congestion control to the fourth congestion control. In other words, depending on a type of congestion control, the NW may use Identification information as information indicating congestion control, or other identification information may be used as information indicating congestion control in accordance with the type of congestion control, without using the Identification information.

Note that, in the present embodiment, in a case that the third congestion control is not performed, the implication corresponding to the third congestion control is unnecessary in the Indication information of the 16th identification information described above, and a process, description, and implication of the third congestion control may be omitted from the description of the Indication of the 16th identification information described above. Furthermore, in the present embodiment, in a case that the fourth congestion control is not performed, the implication corresponding to the fourth congestion control is unnecessary in the Indication information of the 16th identification information described above, and a process, description, and implication of the fourth congestion control may be omitted from the description of the Indication information of the 16th identification information described above.

17th identification information in the present embodiment is one or more pieces of Value information indicating that the present procedure has been rejected. In other words, the Value Information may be information indicating congestion control applied to the present procedure by the NW. Note that the 17th identification information may be information including at least one of identification information for identifying one or more NW slices included in 18th identification information and/or the 12th identification information.

The NW may indicate congestion control applied by the NW based on the 17th identification information. In other words, the NW may indicate which congestion control among the congestion controls from the first congestion control to the fourth congestion control has been applied based on the 17th identification information. Furthermore, the NW may indicate the DNN and/or the S-NSSAI that is subjected to congestion control to be applied to the UE based on transmission of a PDU session reject message based on the 17th identification information. For example, in a case that the 17th identification information is just a DNN #1, it indicates that the first congestion control for the DNN #1 has been applied. In a case that the 17th identification information is just S-NSSAI #1, it indicates that the second congestion control for the S-NSSAI #1 has been applied. In a case that the 17th information is configured with the DNN #1 and S-NSSAI #1, it may indicate that the third congestion control or the fourth congestion control for at least one of the DNN #1 and/or the S-NSSAI #1 has been applied.

Note that the 17th identification information need not necessarily be information that can identify which congestion control has been applied among the congestion controls from the first congestion control to the fourth congestion control, and the 17th identification information may be information indicating the DNN and/or the S-NSSAI that is subjected to congestion control identified by other means, such as being identified based on other identification information.

18th identification information in the present embodiment may be information indicating that a request for establishment of a PDU session belonging to a first NW slice has been rejected or may be information indicating that a request for establishment of a PDU session belonging to the first NW slice or change of a PDU session (PDU session modification) is not allowed. Here, the first NW slice may be an NW slice determined with the first identification information, or a different NW slice. Furthermore, the 18th identification information may be information indicating that the establishment of a PDU session belonging to the first NW slice on a DN identified with the 12th identification information is not allowed or may be information indicating that the establishment of a PDU session belonging to the first NW slice in the PDU session identified with the 13th identification information is not allowed. Furthermore, 11th identification information may be information indicating that the establishment of a PDU session belonging to a first slice is not allowed in a registration area and/or a tracking area to which the UE_A 10 currently belongs or may be information indicating that the establishment of a PDU session belonging to the first NW slice is not allowed on an access network to which the UE_A 10 is connected. Further, the 11th identification information may be identification information for identifying one or more NW slices that determine the NW slice to which the rejected PDU session request belongs. Furthermore, the 18th identification information may be identification information indicating assistance information for a radio access system to select an appropriate MME in a case that the UE switches the connection destination to an EPS. Note that the assistance information may be information indicating a DCN ID. Further, the 18th identification information may be a network slice association rule that is a rule associating a plurality of pieces of slice information.

21st identification information in the present embodiment may be information for stopping one or more first timers activated by the UE, or may be information indicating a first timer to be stopped among the first timers activated by the UE. Specifically, the 21st identification information may be information indicating the 13th identification information stored in the UE in association with the first timers. Furthermore, the 21st identification information may be information indicating at least one of the 12th identification information to the 18th identification information stored in the UE in association with the first timers.

Furthermore, the 21st identification information may be information that changes the association of the first timers stored by the UE with information indicating at least one of the 13th identification information to the 17th identification information. For example, at a time when a first timer for preventing a UE-initiated session management of a combination of a DNN #A and an S-NSSAI #A is activated, in a case that an NW-initiated session management request including the 21st identification information that allows a connection to the DNN #A has been received, the UE may change the association target of the activated timer only to the S-NSSAI #A and recognize that the UE-initiated session management request to the DNN #A has been allowed. In other words, the 21st identification information may be information indicating that the congestion control applied at the time of reception of the 21st identification information is changed to another congestion control among the congestion controls from the first to the fourth congestion control.

Figure 9:
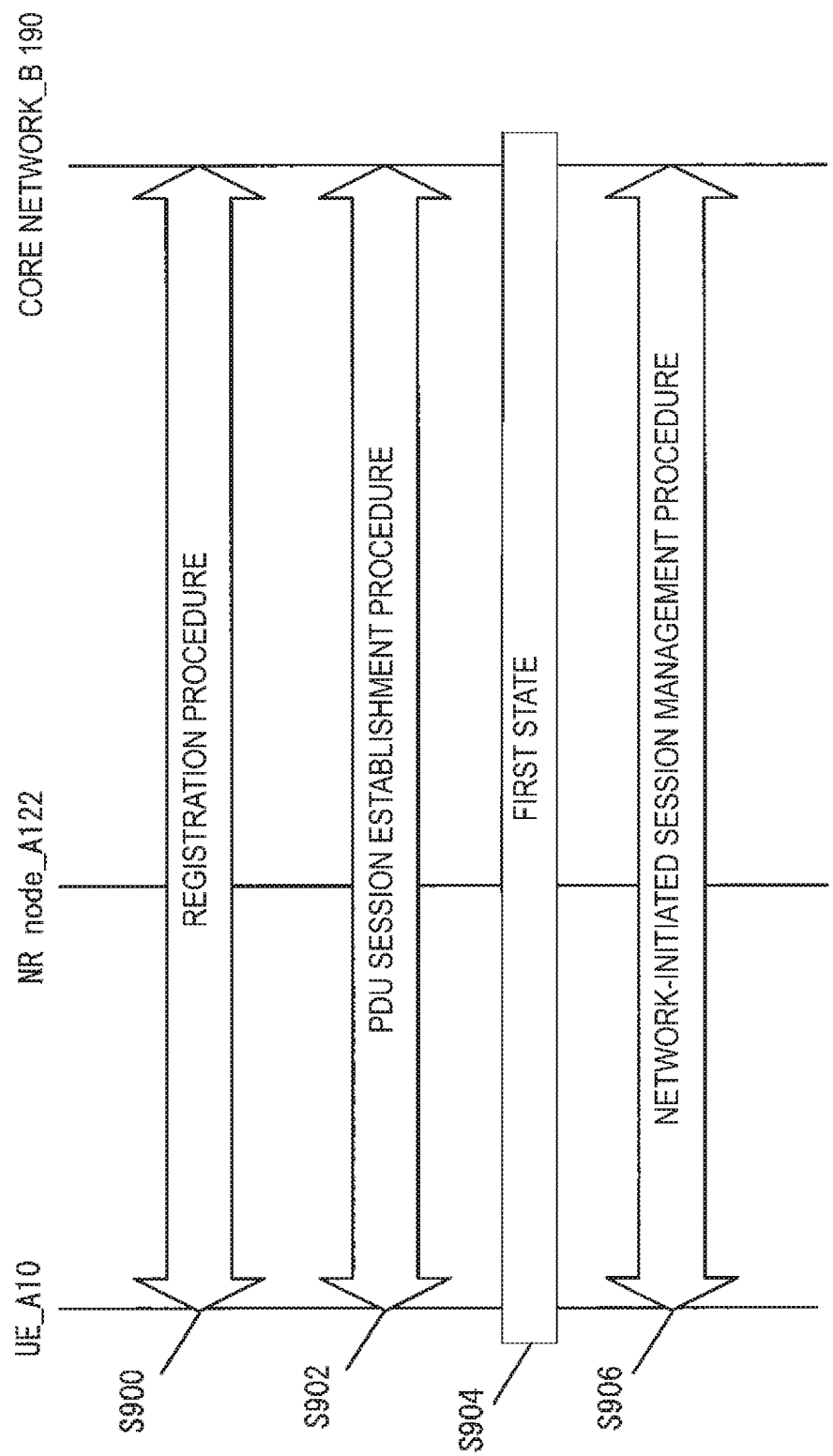
FIG. 9 is a diagram illustrating an initial procedure.

Next, an initial procedure according to the present embodiment will be described with reference to FIG. 9. Hereinafter, the initial procedure will also be referred to as the present procedure, and the present procedure includes a Registration procedure, a PDU session establishment procedure, and a network-initiated session management procedure. Details of the registration procedure, the PDU session establishment procedure, and the network-initiated session management procedure will be described below.

Specifically, each apparatus performs the registration procedure (S900), and the UE_A 10 transitions to a state of being registered in the network (RM-REGISTERED state). Next, each apparatus performs the PDU session establishment procedure (S902), and the UE_A 10 establishes a PDU session with the DN_A 5 that provides a PDU connection service via the core network_B 190 and each apparatus transitions to a first state (S904). Note that, although this PDU session is assumed to be established via the access network and the UPF_A 235, the procedure is not limited thereto. That is, a UPF (UPF_C 239) that is different from the UPF_A 235 may be present between the UPF_A 235 and the access network. At this time, the PDU session is established via the access network, the UPF_C 239, and the UPF_A 235. Next, each apparatus in the first state may perform the network-initiated session management procedure at any timing (S906).

Note that each apparatus may exchange various kinds of capability information and/or various kinds of request information of each apparatus in the registration procedure and/or the PDU session establishment procedure and/or the network-initiated session management procedure. In addition, in a case that each apparatus performs the exchange of various kinds of information and/or negotiation of various requests in the registration procedure, each apparatus may or may not perform the exchange of various kinds of information and/or the negotiation of various requests in the PDU session establishment procedure and/or the network-initiated session management procedure. In addition, in a case that each apparatus does not perform the exchange of various kinds of information and/or the negotiation of various requests in the registration procedure, each apparatus may perform the exchange of various kinds of information and/or the negotiation of various requests in the PDU session establishment procedure and/or the network-initiated session management procedure. In addition, even in a case that each apparatus performs the exchange of various kinds of information and/or the negotiation of various requests in the registration procedure, each apparatus may perform the exchange of various kinds of information and/or the negotiation of various requests in the PDU session establishment procedure and/or the network-initiated session management procedure.

In addition, each apparatus may perform the PDU session establishment procedure in the registration procedure or after the registration procedure is completed. Furthermore, in a case that the PDU session establishment procedure is performed in the registration procedure, the PDU session establishment request message may be included in the registration request message and transmitted and/or received, and the PDU session establishment accept message may be included in the registration accept message and transmitted and/or received, a PDU session establishment complete message may be included in a registration complete message and transmitted and/or received, and a PDU session establishment reject message may be included in a registration reject message and transmitted and/or received. In addition, in a case that the PDU session establishment procedure is performed in the registration procedure, each apparatus may establish a PDU session based on the completion of the registration procedure or may transition to the state in which a PDU session is established among the apparatuses.

Furthermore, each apparatus involved in the present procedure may transmit and/or receive each control message described in the present procedure to transmit and/or receive one or more pieces of identification information included in each control message and store each piece of identification information transmitted and/or received as a context.

1.3.1. Overview of Registration Procedure

First, an overview of the registration procedure will be described. The registration procedure is a procedure initiated by the UE_A 10 to perform registration in a network (the access network and/or the core network_B 190 and/or the DN_A 5). In a state in which the UE_A 10 is not registered in the network, the UE_A 10 can perform the present procedure at any timing such as the timing of power input. In other words, the UE_A 10 may initiate the present procedure at any timing in a non-registered state (RM-DEREGISTERED state). In addition, each apparatus may transition to a registered state (RM-REGISTERED state), based on completion of the registration procedure.

Furthermore, the present procedure may be a procedure for updating location registration information of the UE_A 10 in the network, for regularly notifying the network of a state of the UE_A 10 from the UE_A 10, and/or for updating specific parameters related to the UE_A 10 in the network.

The UE_A 10 may initiate the present procedure at a time when the UE_A 10 applies mobility across TAs. In other words, the UE_A 10 may initiate the present procedure at a time when the UE_A 10 moves to a TA different from the TA indicated on a TA list that the UE_A 10 holds. Furthermore, the UE_A 10 may initiate the present procedure at a time when a running timer expires. Furthermore, the UE_A 10 may initiate the present procedure at a time when a context of each apparatus needs to be updated due to disconnection or invalidation (also referred to as deactivation) of a PDU session. Furthermore, the UE_A 10 may initiate the present procedure at a time when a change occurs in capability information and/or preference pertaining to PDU session establishment of the UE_A 10. Furthermore, the UE_A 10 may initiate the present procedure regularly. Note that, the UE_A 10 is not limited to the above and can perform the present procedure at any timing as long as a PDU session is established.

1.3.1.1. Example of Registration Procedure

Figure 10:
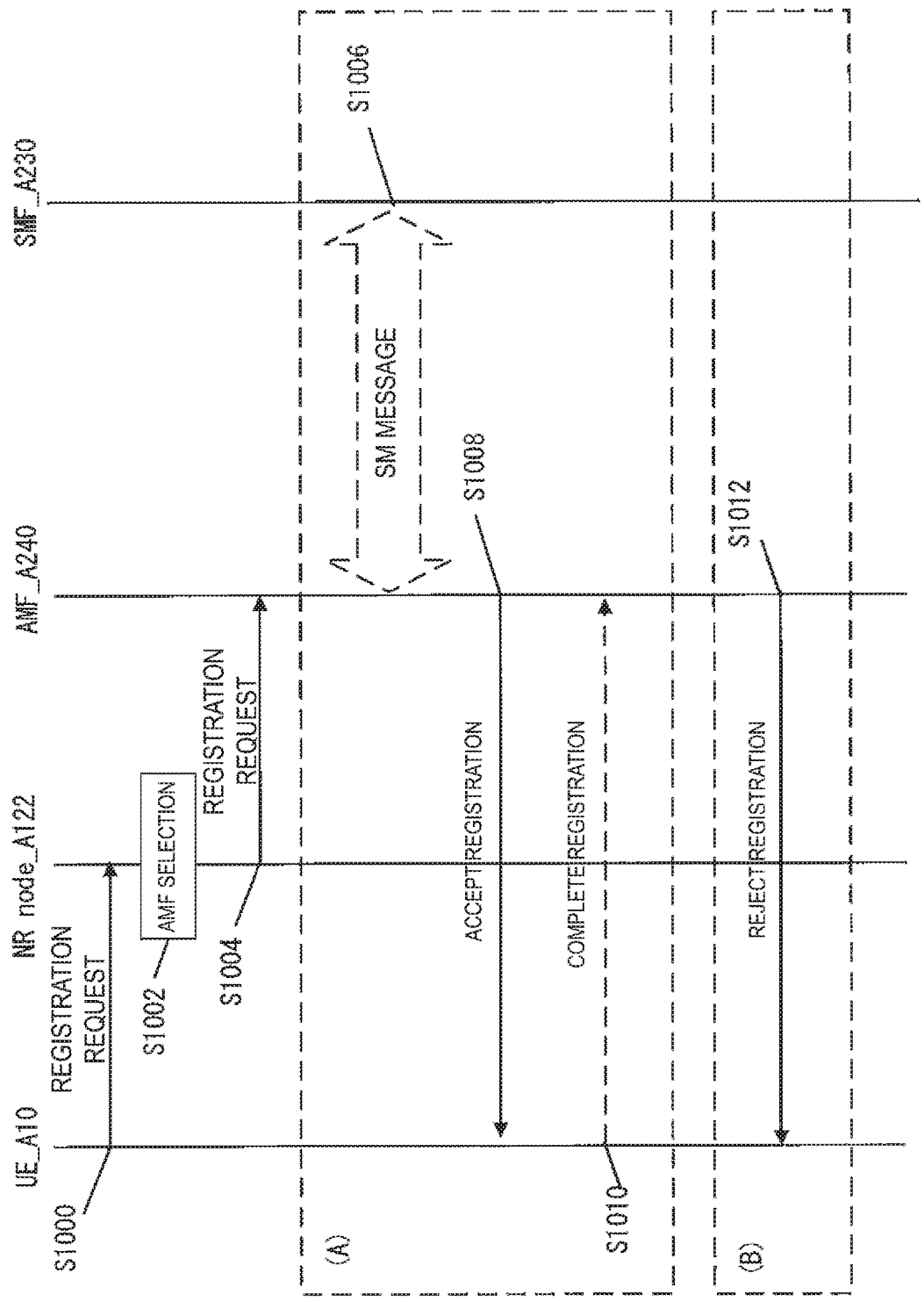
FIG. 10 is a diagram illustrating a registration procedure.

An example procedure to perform the registration procedure will be described with reference to FIG. 10. In the present section, the present procedure refers to the registration procedure. Each step of the present procedure will be described below.

First, the UE_A 10 transmits a Registration Request message to the AMF_A 240 via a NR node (also referred to as a gNB) A 122 and/or ng-eNB (S1000) (S1002) (S1004) to initiate the registration procedure. In addition, the UE_A 10 may transmit a Session Management (SM) message (e.g., a PDU session establishment request message) included in a registration request message, or transmits the SM message (e.g., the PDU session establishment request message) along with the registration request message to initiate a procedure for SM, such as a PDU session establishment procedure, during the registration procedure.

Specifically, the UE_A 10 transmits a Radio Resource Control (RRC) message including the registration request message to the NR node_A 122 and/or ng-eNB (S1000). In a case that the RRC message including the registration request message is received, the NR node_A 122 and/or ng-eNB retrieves the registration request message from the RRC message and selects the AMF_A 240 as a NF or a common CP function to which the registration request message is routed (S1002). Here, the NR node_A 122 and/or ng-eNB may select the AMF_A 240 based on information included in the RRC message. The NR node_A 122 and/or ng-eNB transmits or transfers the registration request message to the selected AMF_A 240 (S1004).

Note that, the registration request message is a Non-Access-Stratum (NAS) message transmitted and/or received on the N1 interface. In addition, the RRC message is a control message transmitted and/or received between the UE_A 10 and the NR node_A 122 and/or ng-eNB. Furthermore, the NAS message is processed in an NAS layer, the RRC message is processed in an RRC layer, and the NAS layer is a higher layer than the RRC layer.

In addition, in a case that there are a plurality of NSIs requesting registration, the UE_A 10 may transmit a registration request message for each of the NSIs, or may transmit a plurality of registration request messages included in one or more RRC messages. Furthermore, the above-described plurality of registration request messages may be included in one or more RRC messages and transmitted as one registration request message.

In a case that a registration request message and/or a control message different from the registration request message is received, an AMF_A 240 performs first condition determination. The first condition determination is intended to determine whether the AMF_A 240 accepts a request of the UE_A 10. In the first condition determination, the AMF_A 240 determines whether the first condition determination is true or false. The AMF_A 240 initiates a procedure (A) in the present procedure in a case that the first condition determination is true (that is, the network accepts the request of the UE_A 10), and initiates a procedure (B) in the present procedure in a case that the first condition determination is false (that is, the network does not accept the request of the UE_A 10).

Next, steps performed in a case that the first condition determination is true, that is, each step of the procedure (A) in the present procedure, will be described. The AMF_A 240 performs fourth condition determination, and initiates the procedure (A) in the present procedure. The fourth condition determination is to determine whether the AMF_A 240 transmits and/or receives an SM message to/from the SMF_A 230. In other words, the fourth condition determination may determine whether the AMF_A 240 performs a PDU session establishment procedure in the present procedure. In a case that the fourth condition determination is true (that is, the AMF_A 240 transmits and/or receives an SM message to and from the SMF_A 230), the AMF_A 240 selects the SMF_A 230 and transmits and/or receives the SM message to and/or from the selected SMF_A 230, and in a case that the fourth condition determination is false (that is, the AMF_A 240 does not transmit and/or receive an SM message to and from the SMF_A 230), the AMF_A 240 skips the process (S1006). Note that in a case that the AMF_A 240 has received an SM message indicating rejection from the SMF_A 230, the AMF_A 240 may stop the procedure (A) in the present procedure and initiate a procedure (B) in the present procedure.

In addition, the AMF_A 240 transmits a Registration Accept message to the UE_A 10 via the NR node_A 122 based on the reception of the registration request message from the UE_A 10 and/or the completion of the transmission and/or reception of the SM message to and/or from the SMF_A 230 (S1008). For example, in a case that the fourth condition determination is true, the AMF_A 240 may transmit the registration accept message based on the reception of the registration request message from the UE_A 10. In addition, in a case that the fourth condition determination is false, the AMF_A 240 may transmit the registration accept message based on the completion of the transmission and/or reception of the SM message to and/or from the SMF_A 230. Here, the registration accept message may be transmitted as a response message to the registration request message. In addition, the registration accept message is a NAS message transmitted and/or received on the N1 interface, and for example, the AMF_A 240 may transmit it as a control message of the N2 interface to the NR node_A 122, and the NR node_A 122 that has received the message may include the message in an RRC message and transmit it to the UE_A 10.

Further, in a case that the fourth condition determination is true, the AMF_A 240 may include an SM message such (e.g., a PDU session establishment accept message) in the registration accept message and transmit it, or may transmit the SM message (e.g., a PDU session establishment accept message) along with the registration accept message. In addition, this transmission method may be performed in a case that the SM message (e.g., the PDU session establishment request message) is included in the registration request message and the fourth condition determination is true. Furthermore, the transmission method may be performed in a case that the registration request message and the SM message (e.g., the PDU session establishment request message) are included and the fourth condition determination is true. The AMF_A 240 may indicate that the procedure for SM has been accepted by performing such a transmission method.

The UE_A 10 receives the registration accept message via the NR node_A 122 (S1008). The UE_A 10 receives the registration accept message to recognize the content of various kinds of identification information included in the registration accept message.

Next, the UE_A 10 transmits a Registration Complete message to the AMF_A 240 based on the reception of the registration accept message (S1010). Note that, in a case that the UE_A 10 has received an SM message such as a PDU session establishment accept message, the UE_A 10 may transmit the SM message such as the PDU session establishment complete message included in the registration complete message, or may include the SM message therein to indicate that the procedure for the SM is completed. Here, the registration complete message may be transmitted as a first response message to the registration accept message. In addition, the registration complete message is a NAS message transmitted and/or received on the N1 interface, and for example, the UE_A 10 may include it in an RRC message and transmit it to the NR node_A 122, and the NR node_A 122 that has received the message may transmit the message to the AMF_A 240 as a control message of the N2 interface.

The AMF_A 240 receives the registration complete message (S1010). In addition, each apparatus completes the procedure (A) in the present procedure based on the transmission and/or reception of the registration accept message and/or the registration complete message.

Next, steps in a case that the first condition determination is true, in other words, each step of the procedure (B) in the present procedure will be described. The AMF_A 240 transmits a Registration Reject message to the UE_A 10 via the NR node_A 122 (S1012) to initiate the procedure (B) in the present procedure. Here, the registration reject message may be transmitted as a response message to the registration request message. In addition, the registration reject message is a NAS message transmitted and/or received on the N1 interface, and for example, the AMF_A 240 may transmit it as a control message of the N2 interface to the NR node_A 122, and the NR node_A 122 that has received the message may include the message in an RRC message and transmit it to the UE_A 10. Further, the registration reject message transmitted by the AMF_A 240 is not limited thereto as long as it is a message for rejecting the request of the UE_A 10.

Note that the procedure (B) in the present procedure may be initiated in a case that the procedure (A) in the present procedure is stopped. Note that, in the procedure (A), in a case that the fourth condition determination is true, the AMF_A 240 may include, in the registration reject message, an SM message indicating rejection such as a PDU session establishment reject message, or the like and transmit the SM message, or indicate that a procedure for the SM has been rejected by including the SM message indicating rejection. In that case, the UE_A 10 may further receive the SM message indicating rejection such as the PDU session establishment reject message, or may recognize that the procedure for SM has been rejected.

Furthermore, the UE_A 10 may receive a registration reject message or may not receive a registration accept message to recognize that a request of the UE_A 10 has been rejected. Each apparatus completes the procedure (B) in the present procedure based on the transmission and/or reception of the registration reject message.

Each apparatus completes the present procedure (registration procedure), based on the completion of the procedure (A) or (B) in the present procedure. Note that each apparatus may transition to a state in which the UE_A 10 is registered in the network (RM_REGISTERED state) based on the completion of the procedure (A) in the present procedure, or may maintain a state in which the UE_A 10 is not registered in the network (RM_DEREGISTERED state) based on the completion of the procedure (B) in the present procedure. In addition, transition to each state of each apparatus may be performed based on completion of the present procedure, or may be performed based on establishment of a PDU session.

Furthermore, each apparatus may perform processing based on identification information transmitted and/or received in the present procedure, based on completion of the present procedure.

Furthermore, the first condition determination may be performed based on identification information, and/or subscriber information, and/or an operator policy included in the registration request message. For example, the first condition determination may be true in a case that the network allows a request of the UE_A 10. In addition, the first condition determination may be false in a case that the network does not allow a request of the UE_A 10. Furthermore, the first condition determination may be true in a case that the network of a destination of registration of the UE_A 10 and/or an apparatus in the network supports a function requested by the UE_A 10, and may be false in a case that the network and/or the apparatus does not support the function. Furthermore, the first condition determination may be true in a case that the network determines that the network is congested, and may be false in a case that it is determined that the network is not congested. Note that conditions for determining whether the first condition determination is true or false may not be limited to the above-described conditions.

In addition, the fourth condition determination may also be performed based on whether the AMF_A 240 has received an SM or may be performed based on whether an SM message is included in the registration request message. For example, the fourth condition determination may be true in a case that the AMF_A 240 has received the SM and/or the SM message is included in the registration request message, and may be false in a case that the AMF_A 240 has not received the SM and/or the SM message is not included in the registration request message. Note that conditions for determining whether the fourth condition determination is true or false may not be limited to the above-described conditions.

1.3.2. Overview of PDU Session Establishment Procedure

Next, an overview of the PDU session establishment procedure performed to establish a PDU session with the DN_A 5 will be described. The PDU session establishment procedure will also be referred to as a present procedure below. The present procedure is a procedure for each apparatus to establish a PDU session. Note that each apparatus may perform the present procedure in a state in which the registration procedure is completed or during the registration procedure. In addition, each apparatus may initiate the present procedure in a registered state, or may initiate the present procedure at any timing after the registration procedure. In addition, each apparatus may establish a PDU session, based on completion of the PDU session establishment procedure. Furthermore, each apparatus may perform the present procedure a plurality of times to establish a plurality of PDU sessions.

1.3.2.1. Example of PDU Session Establishment Procedure

Figure 11:
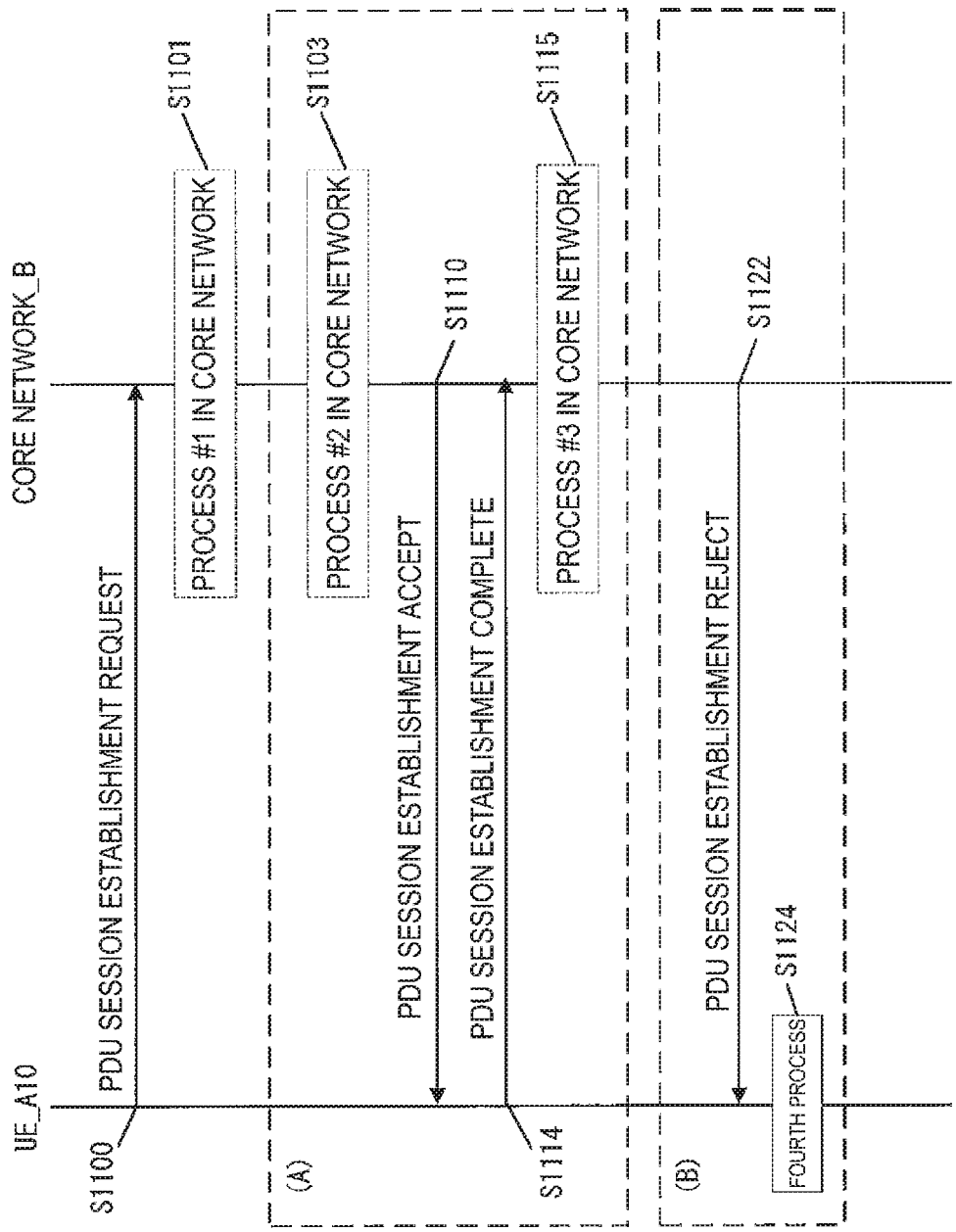
FIG. 11 is a diagram illustrating a PDU session establishment procedure.

With reference to FIG. 11, an example of steps to perform a PDU session establishment procedure will be described. Each step of the present procedure will be described below. First, the UE_A 10 transmits a PDU Session Establishment Request message to a core network_B via an access network_B (S1100), and initiates the PDU session establishment procedure.

Specifically, the UE_A 10 transmits the PDU session establishment request message to the AMF_A 240 in the core network_B 190 via the NR node_A 122 using the N1 interface (S1100). The AMF_A receives the PDU session establishment request message and performs third condition determination. The third condition determination is to determine whether the AMF_A accepts a request of the UE_A 10. In the third condition determination, the AMF_A determines whether the fifth condition determination is true or false. In a case that the third condition determination is true, the core network_B initiates a process #1 in the core network, and in a case that the third condition determination is false, the core network_B initiates the procedure (B) in the present procedure. Note that steps performed in a case that the third condition determination is false will be described below. Here, the process #1 in the core network may be selection of an SMF by the AMF_A in the core network_B 190 and/or transmission and/or reception of a PDU session establishment request message between the AMF_A and the SMF_A.

The core network_B 190 initiates the process #1 in the core network. In the process #1 in the core network, the AMF_A 240 may select the SMF_A 230 as an NF as a routing destination of the PDU session establishment request message and may transmit or transfer the PDU session establishment request message to the selected SMF_A 230 using an N11 interface. Here, the AMF_A 240 may select the SMF_A 230 as a routing destination based on information included in the PDU session establishment request message. More specifically, the AMF_A 240 may select the SMF_A 230 as a routing destination based on each piece of identification information acquired based on the reception of the PDU session establishment request message, and/or subscriber information, and/or network capability information, and/or an operator policy, and/or a network state, and/or a context already held by the AMF_A 240.

Note that the PDU session establishment request message may be a NAS message. In addition, the PDU session establishment request message only needs to be a message requesting establishment of a PDU session and is not limited to this.

Here, the UE_A 10 may include one or more pieces of identification information among pieces of identification information from the first identification information to the fourth identification information in the PDU session establishment request message, or may indicate a request of the UE_A 10 by including these pieces of identification information. Note that two or more pieces of identification information of the identification information may be configured as one or more pieces of identification information.

Furthermore, the UE_A 10 may include the first identification information and/or the second identification information and/or the third identification information and/or the fourth identification information in the PDU session establishment request message and transmit them to request establishment of a PDU session belonging to a network slice, to indicate a network slice to which the PDU session belongs requested by the UE_A 10, or to indicate a network slice to which the PDU session is to belong.

More particularly, the UE_A 10 may associate the first identification information with the second identification information and transmit them to request establishment of a PDU session belonging to a network slice in a PDU session established for a DN identified with the second identification information, to indicate a network slice to which the PDU session belongs requested by the UE_A 10, or to indicate a network slice to which the PDU session is to belong.

Furthermore, the UE_A 10 may combine and transmit two or more pieces of identification information among pieces of identification information from the first identification information to the fourth identification information to make a request of a combination of the above-described matters. Note that matters indicated by the UE_A 10 transmitting the identification information may not be limited thereto.

Note that the UE_A 10 may determine which piece of identification information among pieces of identification information from the first identification information to the fourth identification information is to be included in the PDU session establishment request message, based on capability information of the UE_A 10, and/or a policy such as a UE policy, and/or a preference of the UE_A 10, and/or an application (higher layer). Note that the determination performed by the UE_A 10 as to which piece of identification information is to be included in the PDU session establishment request message is not limited to the determination described above.

The SMF_A 230 within the core network_B 190 receives the PDU session establishment request message and performs the third condition determination. The third condition determination is to determine whether the SMF_A 230 accepts a request of the UE_A 10. In the third condition determination, the SMF_A 230 determines whether the third condition determination is true or false. In a case that the third condition determination is true, the SMF_A 230 initiates the procedure (A) in the present procedure, and in a case that the third condition determination is false, the SMF_A 230 initiates the procedure (B) in the present procedure. Note that steps performed in a case that the third condition determination is false will be described below.

Steps performed in a case that the third condition determination is true, that is, each step of the procedure (A) in the present procedure will be described below. The SMF_A 230 selects the UPF_A 235 with which the PDU session is to be established and performs 11th condition determination.

Here, the 11th condition determination is for determining whether each apparatus performs a process #2 in the core network. Here, the process #2 in the core network may include initiation and/or execution of a PDU session establishment authentication procedure by each apparatus and/or transmission and/or reception of a Session Establishment request message between the SMF_A and UPF_A in the core network_B 190, and/or transmission and/or reception of Session Establishment response message, and the like. In the 11th condition determination, the SMF_A 230 determines whether the 11th condition determination is true or false.

The SMF_A 230 initiates a PDU session establishment authentication and/or authorization procedure in case that the 11th condition determination is true, and omits the PDU session establishment authentication and/or authorization procedure in a case that the 11th condition determination is false. Note that the details of the PDU session establishment authentication and/or authorization procedure of the process #2 in the core network will be described below.

Next, the SMF_A 230 transmits a session establishment request message to the selected UPF_A 235 based on the 11th condition determination and/or completion of the PDU session establishment authentication and/or authorization procedure, and initiates the procedure (A) in the present procedure. Note that the SMF_A 230 may initiate the procedure (B) in the present procedure without initiating the procedure (A) in the present procedure, based on the completion of the PDU session establishment authentication and/or authorization procedure.

Here, the SMF_A 230 may select one or more UPFs_A 235 based on each piece of identification information acquired based on the reception of the PDU session establishment request message, and/or network capability information, and/or subscriber information, and/or an operator policy, and/or a network state, and/or a context already held by the SMF_A 230. Note that in a case that a plurality of UPFs_A 235 are selected, the SMF_A 230 may transmit the session establishment request message to each UPF_A 235.

The UPF_A 235 receives the session establishment request message and generates a context for the PDU session. In addition, the UPF_A 235 transmits a session establishment response message to the SMF_A 230 based on the reception of the session establishment request message and/or the creation of the context for the PDU session. Furthermore, the SMF_A 230 receives the session establishment response message. Note that the session establishment request message and the session establishment response message may be control messages transmitted and/or received on the N4 interface. Further, the session establishment response message may be a response message to the session establishment request message.

Further, the SMF_A 230 may perform address assignment to assign an address to the UE_A 10 based on the reception of the PDU session establishment request message and/or the selection of the UPF_A 235 and/or the reception of the session establishment response message. Note that the SMF_A 230 may assign the address to the UE_A 10 during the PDU session establishment procedure, or may assign the address after the completion of the PDU session establishment procedure.

Specifically, in a case that the SMF_A 230 allocates an IPv4 address without using a DHCPv4, the SMF_A 230 may assign the address during the PDU session establishment procedure or may transmit the assigned address to the UE_A 10. In addition, in a case that the SMF_A 230 assigns the IPv4 address, and/or the IPv6 address, and/or the IPv6 prefix using the DHCPv4 or the DHCPv6 or Stateless Address Autoconfiguration (SLAAC), the SMF_A 230 may assign the address after the PDU session establishment procedure or may transmit the assigned address to the UE_A 10. Note that the address assignment performed by SMF_A 230 is not limited thereto.

Furthermore, the SMF_A 230 may include the assigned address in the PDU session establishment accept message and may transmit it to the UE_A 10 based on the completion of the address assignment of the address to be assigned to the UE_A 10 or may transmit it to the UE_A 10 after the completion of the PDU session establishment procedure.

The SMF_A 230 transmits the PDU session establishment accept message to the UE_A 10 via the AMF_A 240, based on the reception of the PDU session establishment request message, and/or the selection of the UPF_A 235, and/or the reception of the session establishment response message, and/or the completion of the address assignment of the address to be assigned to the UE_A 10 (S1110).

Specifically, the SMF_A 230 transmits the PDU session establishment accept message to the AMF_A 240 using the N11 interface, and the AMF_A 240 that has received the PDU session establishment accept message transmits the PDU session establishment accept message to the UE_A 10 using the N1 interface.

Note that in a case that the PDU session is a PDN connection, the PDU session establishment accept message may be a PDN connectivity accept message. Furthermore, the PDU session establishment accept message may be a NAS message transmitted and/or received on the N11 interface and the N1 interface. In addition, the PDU session establishment accept message is not limited to the above, and only needs to be a message indicating that the establishment of the PDU session has been accepted.

The UE_A 10 receives the PDU session establishment accept message from the SMF_A 230. The UE_A 10 receives the PDU session establishment accept message to recognize the content of various kinds of identification information included in the PDU session establishment accept message.

Next, the UE_A 10 transmits a PDU session establishment complete message to the SMF_A 230 via the AMF_A 240 based on the reception completion of the PDU session establishment accept message (S1114). Furthermore, the SMF_A 230 receives the PDU session establishment complete message and performs the second condition determination.

Specifically, the UE_A 10 transmits the PDU session establishment complete message to the AMF_A 240 using the N1 interface, and the AMF_A 240 that has received the PDU session establishment complete message transmits the PDU session establishment complete message to the SMF_A 230 using the N11 interface.

Note that, in a case that the PDU session is a PDN connection, the PDU session establishment complete message may be a PDN Connectivity complete message or may be an Activate default EPS bearer context accept message. Furthermore, the PDU session establishment complete message may be a NAS message transmitted and/or received on the N1 interface and the N11 interface. In addition, the PDU session establishment complete message only needs to be a response message to the PDU session establishment accept message, but the message is not limited to this, and only needs to be a message indicating that the PDU session establishment procedure is completed.

The second condition determination is for the SMF_A 230 to determine a type of the message on the N4 interface to be transmitted and/or received. In a case that the second condition determination is true, a process #3 in the core network may be initiated (S1115). Here, the process #3 in the core network may include transmission and/or reception of a Session Modification request message, and/or transmission and/or reception of a Session Modification response message, and the like. The SMF_A 230 transmits a session modification request message to the UPF_A 235, and further receives a session modification accept message transmitted from the UPF_A 235 that has received the session modification request message. In addition, in a case that the second condition determination is false, the SMF_A 230 performs the process #2 in the core network. That is, the SMF_A transmits a session establishment request message to the UPF_A 235, and further receives the session modification accept message transmitted from the UPF_A 235 that has received the session establishment request message.

Each apparatus completes the procedure (A) in the present procedure, based on the transmission and/or reception of the PDU session establishment complete message, and/or the transmission and/or reception of the session modification response message, and/or the transmission and/or reception of the session establishment response message, and/or the transmission and/or reception of a Router Advertisement (RA).

Next, steps performed in a case that the third condition determination is false, that is, each step of the procedure (B) in the present procedure, will be described. The SMF_A 230 transmits a PDU session establishment reject message to the UE_A 10 via the AMF_A 240 (S1122) and initiates the procedure (B) in the present procedure.

Specifically, the SMF_A 230 transmits the PDU session establishment reject message to the AMF_A 240 using the N11 interface, and the AMF_A 240 that has received the PDU session establishment request message transmits the PDU session establishment reject message to the UE_A 10 using the N1 interface.

Note that, in a case that the PDU session is a PDN connection, the PDU session establishment reject message may be a PDN Connectivity reject message. Furthermore, the PDU session establishment reject message may be a NAS message transmitted and/or received on the N11 interface and the N1 interface. In addition, the PDU session establishment reject message is not limited thereto, and only needs to be a message indicating that the establishment of the PDU session has been rejected.

Here, the SMF_A 230 may include one or more pieces of identification information among the 11th identification information to the 18th identification information in the PDU session establishment reject message, or may indicate that a request of the UE_A 10 has been rejected by including these pieces of identification information. Note that two or more pieces of identification information of the identification information may be configured as one or more pieces of identification information.

Furthermore, the SMF_A 230 may include 11th identification information and/or 12th identification information and/or 13th identification information and/or 14th identification information and/or 15th identification information and/or 16th identification information and/or 17th identification information and/or 18th identification information in the PDU session establishment reject message and transmit them to indicate that a request to establish a PDU session belonging to a network slice has been rejected, or to indicate a network slice that is not allowed to belong to the PDU session.

More particularly, the SMF_A 230 may transmit the 18th identification information and the 12th identification information in association with each other to indicate that, in a PDU session established for the DN identified with the 12th identification information, a request to establish a PDU session belonging to a network slice has been rejected, or to indicate a network slice that is not allowed to belong to the PDU session.

Furthermore, the SMF_A 230 may include the 18th identification information in the PDU session establishment reject message and transmit it to indicate that, in a registration area and/or a tracking area to which the UE_A 10 currently belongs, a request to establish a PDU session belonging to a network slice has been rejected, or to indicate a network slice that is not allowed to belong to the PDU session.

Furthermore, the SMF_A230 may include the 18th identification information in the PDU session establishment reject message and transmit it to indicate that, in the access network to which the UE_A 10 is currently connected, a request to establish a PDU session belonging to a network slice has been rejected, or to indicate a network slice that is not allowed to belong to the PDU session.

Furthermore, the SMF_A 230 may include the 11th identification information and/or the 14th identification information in the PDU session establishment reject message and transmit them to indicate a value of the first timer and to indicate whether the same procedure as the present procedure needs to be performed again after the completion of the present procedure.

Furthermore, the SMF_A 230 may combine and transmit two or more kinds of identification information among the 11th identification information to the 18th identification information to make a request a combination of the above-described matters. Note that matters indicated by the SMF_A 230 transmitting each piece of identification information may not be limited thereto.

Note that the SMF_A 230 may determine which piece of identification information among pieces of identification information from the 11th identification information to the 18th identification information is to be included in the PDU session establishment reject message, based on the received identification information, and/or network capability information, and/or a policy such as an operator policy, and/or a network state.

In addition, the 12th identification information may be information indicating the same DNN as the DNN indicated by the second identification information. Furthermore, the 13th identification information may be information indicating the same PDU session ID as the PDU session ID indicated by the third identification information. Furthermore, the 18th identification information may be information transmitted in a case that the first identification information is received and/or in a case that the network slice indicated by the first identification information is not allowed by the network. Note that the determination performed by the SMF_A 230 as to which piece of identification information is to be included in the PDU session establishment reject message is not limited to the determination described above.

As described above, the core network_B 190 transmits a PDU session reject message to notify the UE_A 10 of congestion control to be applied. Note that the core network_B 190 thus may notify the application of the congestion control to the UE_A 10, and/or indication to the UE_A 10 that the congestion control is to be performed, and/or information for identifying the type of congestion control to be applied, and/or information for identifying a congestion control target such as a DNN and/or S-NSSAI corresponding to the congestion control to be applied, and/or a value of the timer associated with the congestion control to be applied.

Here, each piece of the above-described information may be information identified with one or more pieces of identification information among the 11th identification information to the 18th identification information.

The UE_A 10 may include one or more pieces of identification information among the 11th identification information to the 18th identification information in the PDU session establishment reject message received from the SMF_A 230.

Next, the UE_A 10 performs a fourth process based on the reception of the PDU session establishment reject message (S1124). In addition, the UE_A 10 may perform the fourth process based on the completion of the present procedure.

A first example of the fourth process will be described below.

Here, the fourth process may be a process of recognizing, by the UE_A 10, the matter indicated by the SMF_A 230. Furthermore, the fourth process may be a process of storing, by the UE_A 10, the received identification information as a context, or may be a process of transferring the received identification information to a higher layer and/or a lower layer. Furthermore, the fourth process may be a process of recognizing, by the UE_A 10, that a request for the present procedure has been rejected.

Furthermore, in a case that the UE_A 10 has received the 14th identification information and the 11th identification information, the fourth process may be a process of configuring, by the UE_A 10, the first timer value to the value indicated by the 14th identification information, or may be a process of starting the first timer with the timer value configured. Furthermore, in a case that the UE_A 10 has received the 11th identification information, the fourth process may be a process of performing one or more behaviors among the first to the 11th behaviors.

Further, in a case that the UE_A 10 has received the 18th identification information and the 11th identification information, the fourth process may be a process of performing, by the UE_A 10, the 12th behavior based on information for identifying an NW slice included in the 18th identification information, and a network slice-associated rule included in the 18th identification information or a network slice-associated rule held and configured in the UE_A 10 in advance.

Furthermore, in a case that the UE_A 10 has received a plurality of pieces of the 14th identification information and 11th identification information, the fourth process may be a process of performing, by the UE_A 10, the 13th behavior based on a plurality of first timers included in each piece of the 14th identification information and the priority management rules of the back-off timer held by the UE_A 10.

Furthermore, in a case that the UE_A 10 has received the plurality of pieces of the 14th identification information and the 11th identification information, the fourth process may be a process of performing, by the UE_A 10, the 14th behavior based on a plurality of first timers included in each piece of the 14th identification information.

Here, the 12th to the 15th behaviors may be congestion control initiated and performed by the UE_A 10 based on rules and/or policies within the UE_A 10. Specifically, for example, the UE_A 10 may include, in a storage unit and/or a controller within the UE_A 10, a policy (UE policy) and/or a rule, a management function of the policy and/or the rule, a policy enforcer that causes the UE_A 10 to operate based on the policy and/or the rule, one or more applications, and a session management instances (session manager) for managing one or more PDU sessions to be established or attempted to be established based on a request from each application, and may implement congestion control initiated by the UE_A 10 by performing any of the 12th to the 15th behaviors as the fourth process based on the above elements. Here, the policy and/or the rule may include one or more of the network slice-associated rule and/or a priority management rule for a back-off timer, and/or a Network Slice Selection Policy (NSSP), which may further be preconfigured in the UE_A 10 or received from a network. In addition, here, the policy enforcer may be an NSSP enforcer. In addition, here, the applications may be a protocol of an application layer, and a PDU session may be established or attempted to established based on a request from the protocol of the application layer. In addition, here, the session management instance may be a software element dynamically generated on a per PDU session basis. In addition, here, the S-NSSAI may be grouped as internal processing of the UE_A 10, or processing based on the grouping of the S-NSSAI may be performed. Note that an internal configuration and processing of the UE_A 10 are not limited thereto, and each element may be implemented by software or may be performed as software processing within the UE_A 10.

Furthermore, the UE_A 10 may switch to an EPS in the fourth process or based on the completion of the fourth process, and may initiate position registration at EPS based on the DCN ID included in the 18th identification information. Note that the switch of the UE_A 10 to the EPS may be based on a handover procedure, or may be a RAT switch initiated by the UE_A 10. Additionally, in a case that the UE_A 10 has received the 18th identification information including the DCN ID, the UE_A 10 may perform the switch to the EPS during the fourth process or after the completion of the fourth process.

Furthermore, the fourth process may be a process of initiating, by the UE_A 10, the present procedure again after a certain period of time, or may be a process of transitioning to a state in which the request of the UE_A 10 is limited or restricted.

Note that, the UE_A 10 may transition to a first state according to the completion of the fourth process.

Next, a second example of the fourth process will be described.

Here, the fourth process may be a process of recognizing, by the UE_A 10, the matter indicated by the SMF_A 230. Furthermore, the fourth process may be a process of storing, by the UE_A 10, the received identification information as a context, or may be a process of transferring the received identification information to a higher layer and/or a lower layer.

Furthermore, in the fourth process, processing may be performed to identify application of the congestion control based on one or more pieces of identification information among the 11th identification information to the 18th identification information.

Furthermore, in the fourth process, processing may be performed to identify which type of congestion control to be applied among the congestion controls from the first congestion control to the fourth congestion control and to identify the DNN and/or the S-NSSAI associated with the congested management to be applied based on one or more pieces of identification information among pieces of identification information from the 11th identification information to the 18th identification information. More specifically, the present process may be the process described in the 15th behavior.

Furthermore, in the fourth process, based on one or more pieces of identification information among the 11th identification information to the 18th identification information, a value configured to the first timer indicated by the 14th identification information associated with the congestion control to be applied may be identified and configured, and counting of the first timer may be started. More specifically, the present process may be the process described in the 8th behavior.

Furthermore, in the fourth process, one or more of the first behavior to the seventh behavior may be performed in accordance with the initiation or completion of any of the processes described above.

Furthermore, in the fourth process, one or more of the ninth behavior to the 15th behavior may be performed in accordance with the initiation or completion of any of the processes described above.

Note that, the UE_A 10 may transition to a first state according to the completion of the fourth process.

Although detailed processes for the fourth process have been described using the first example and the second example, the fourth process may not be limited to these processes. For example, the fourth process may be a combined process of a part of the plurality of detailed processes described in the first example and a part of the plurality of detailed processes described in the second example.

Furthermore, the UE_A 10 may receive the PDU session establishment reject message or may not receive the PDU session establishment accept message to recognize that a request of the UE_A 10 has been rejected. Each apparatus completes the procedure (B) in the present procedure based on transmission and/or reception of the PDU session establishment reject message.

Each apparatus completes the present procedure based on completion of the procedure (A) or (B) in the present procedure. Note that each apparatus may transition to a state in which the PDU session is established based on the completion of the procedure (A) in the present procedure. may recognize that the present procedure has been rejected, may transition to a state in which the PDU session has not been established, or may transition to the first state based on the completion of the procedure (B) in the present procedure.

Furthermore, each apparatus may perform processing based on identification information transmitted and/or received in the present procedure based on the completion of the present procedure. In other words, the UE_A 10 may perform the fourth process based on the completion of the present procedure, or may transition to the first state after the completion of the fourth process.

In addition, the third condition determination may be performed based on the identification information included in the PDU session establishment request message, and/or subscriber information, and/or an operator policy. For example, the third condition determination may be true in a case that a network allows a request of the UE_A 10. In addition, the third condition determination may be false in a case that the network does not allow a request of the UE_A 10. Furthermore, the third condition determination may be true in a case that the network serving as a connection destination of the UE_A 10 and/or an apparatus in the network supports the function requested by the UE_A 10, and may be false in a case that the network does not support the function. Furthermore, the third condition determination may be true in a case that the network is determined to be congested, and may be false in a case that the network is determined not to be congested. Note that conditions for determining whether the third condition determination is true or false may not be limited to the above-described conditions.

In addition, the second condition determination may be performed based on whether a session on the N4 interface for the PDU session has been established. For example, the second condition determination may be true in a case that the session on the N4 interface for the PDU session is established, and may be false in a case that the session is not established. Note that conditions for determining whether the second condition determination is true or false may not be limited to the above-described conditions.

In addition, the 11th condition determination may be performed based on the identification information included in the PDU session establishment request message, and/or subscriber information, and/or an operator policy. For example, the 11th condition determination may be true in a case that the network allows authentication and/or approval by the DN_A 5 to be performed during the present procedure. In addition, the 11th condition determination may be false in a case that the network does not allow authentication and/or approval by the DN_A 5 to be performed during the present procedure. Furthermore, the 11th condition determination may be true in a case that the network serving as a connection destination of the UE_A 10 and/or an apparatus in the network support performing authentication and/or approval by the DN_A 5 during the present procedure, or may be false in a case that the network and/or the apparatus do not support the performance. Furthermore, the 11th condition determination may be true in a case that 61st identification information is received, and may be false in a case that the information is not received. In other words, the 11th condition determination may be true in a case that a container including information such as SM PDU DN Request Container and/or a plurality of pieces of information is received, and may be false in a case that the container is not received. Note that conditions for determining whether the 11th condition determination is true or false may not be limited to the above-described conditions.

The transmission and/or reception of the PDU session reject message in the above-described procedure causes the core network_B 190 to notify the UE_A 10 of congestion control to be applied, and the UE_A 10 can apply the congestion control indicated by the core network_B 190. Note that the core network_B 190 and the UE_A 10 may apply a plurality of congestion controls by performing the procedures and processes described in the present procedure a plurality of times. Note that each congestion control operation applied may be congestion control of a different type, congestion control corresponding to a different DNN, and/or congestion control corresponding to a different S-NNSAI, and/or congestion control having a difference in a combination of a DNN and an S-NSSAI.

1.3.3. Overview of Network-Initiated Session Management Procedure

Next, an overview of a network-initiated session management procedure will be described. Hereinafter, the network-initiated session management procedure will also be referred to as the present procedure. The present procedure is a procedure for session management in which a network initiates to perform an established PDU session. Note that the present procedure may be performed at any timing after the registration procedure and/or the PDU session establishment procedure described above is completed and each apparatus transitions to the first state. In addition, each apparatus may transmit and/or receive a message including identification information for stopping or modifying congestion control during the present procedure, or may initiate a behavior based on new congestion control indicated by the network based on the completion of the present procedure.

Alternatively, the UE_A 10 may stop the application of the congestion control identified based on control information transmitted and/or received through the present procedure. In other words, the core network_B 190 initiates the present procedure and transmits the control message and the control information of the present procedure to the UE_A 10 to perform notification to the UE_A 10 such that the application of the congestion control that is identifiable using the control information is stopped.

Note that the present procedure may be a network-initiated PDU session modification procedure, and/or a network-initiated PDU session release procedure, or the like, or may perform a network-initiated session management procedure that is not limited to the above. Note that each apparatus may transmit and/or receive a PDU session modification message in the network-initiated PDU session modification procedure, or may transmit and/or receive a PDU session release message in the network-initiated PDU session release procedure.

1.3.3.1. Example of Network-Initiated Session Management Procedure

Figure 12:
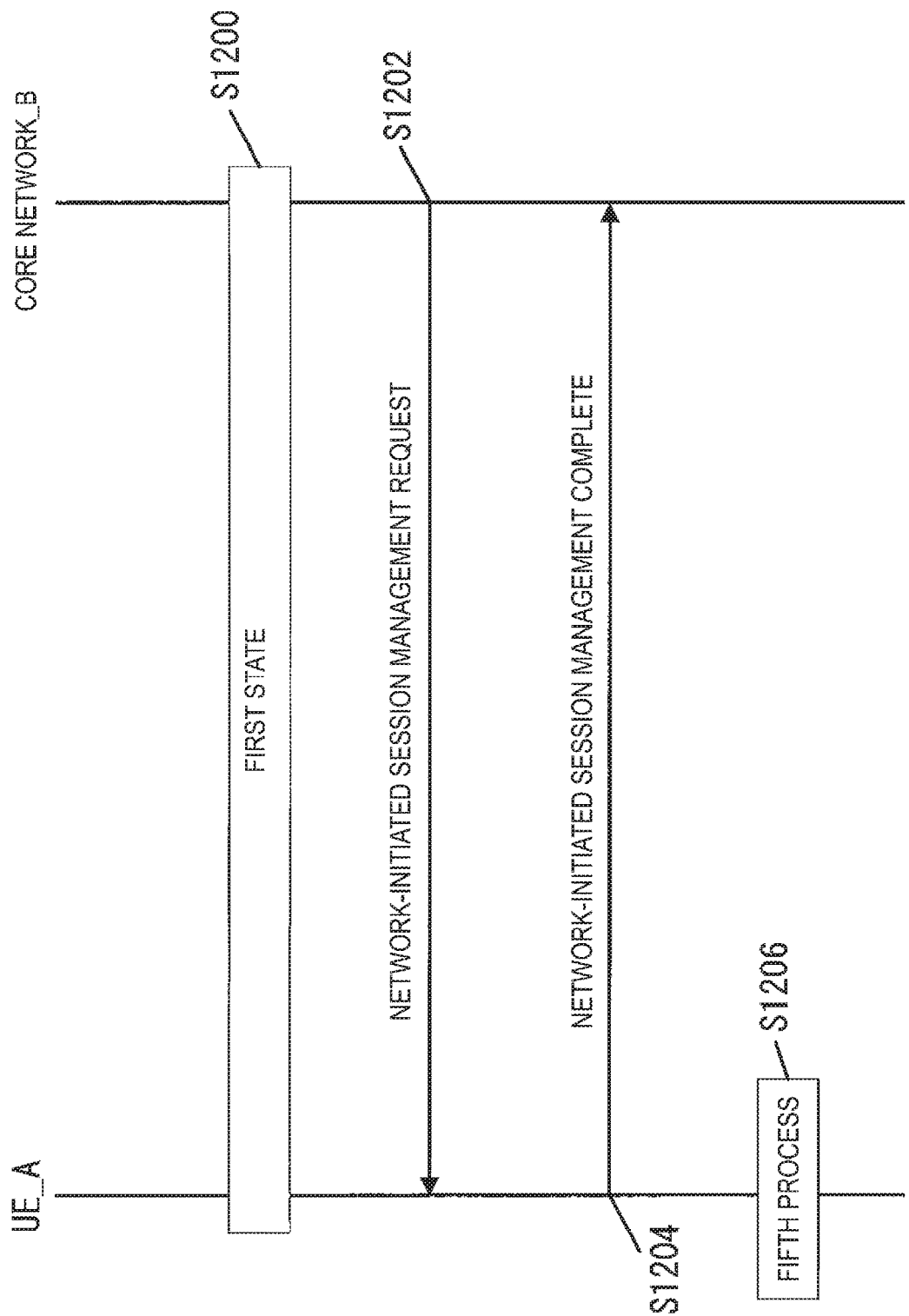
FIG. 12 is a diagram illustrating a network-initiated session management procedure.

An example of the network-initiated session management procedure will be described using FIG. 12. In this section, the present procedure refers to the network-initiated session management procedure. Each step of the present procedure will be described below.

As described above, based on the completion of the registration procedure and/or the PDU session establishment procedure, each apparatus in the UE_A 10 and core network_B 190 that has transitioned to the first state (S1200) initiates the network-initiated session management procedure at any timing. Here, the apparatus in the core network_B 190 that initiates the present procedure may be the SMF_A and/or the AMF_A, and the UE_A may transmit and/or receive a message in the present procedure via the AMF_A and/or the access network_B.

Specifically, the apparatus in the core network_B 190 transmits a network-initiated session management request message to the UE_A (S1202). Here, the apparatus in the core network_B 190 may include the 21st identification information in the network-initiated session management request message, or may indicate a request of the core network_B 190 by including the identification information.

Next, the UE_A that has received the network-initiated session management request message transmits a network-initiated session management complete message (S1204).

Furthermore, the UE_A may perform a fifth process based on the 21st identification information received from the core network_B 190 (S1206), and complete the present procedure. In addition, the UE_A 10 may perform the fifth process based on the completion of the present procedure.

An example of the fifth process will be described below.

Here, the fifth process may be a process of recognizing, by the UE_A 10, the matter indicated by the core network_B 190, or may be a process of recognizing, by the UE_A 10, a request of the core network_B 190. Furthermore, the fifth process may be a process of storing, by the UE_A 10, received identification information as a context, or may be a process of transferring the received identification information to a higher layer and/or a lower layer.

In addition, a message transmitted and/or received in the network-initiated session management request may be a PDU SESSION MODIFICATION COMMAND, may be a PDU SESSION RELEASE COMMAND, and is not limited thereto.

Note that the UE_A 10 may perform the congestion control identification processing applied by the UE_A 10 based on the received 21st identification information in the fifth process. Here, the congestion control identification processing may be the 17th behavior.

Further, in a case that the UE_A 10 receives the 21st identification information, the fifth process may be the 16th behavior. Specifically, it may be, for example, a process of stopping one or a plurality of timers running based on the fourth process described above.

In other words, the UE_A 10 that has received the 21st identification information performs the 17th behavior to identify a congestion control of stop or modification indicated from the network, and subsequently performs the 16th behavior to stop or modify the identified congestion control.

Furthermore, each apparatus may perform a process based on the identification information transmitted and/or received in the present procedure according to the completion of the present procedure. In other words, the UE_A 10 may perform the fifth process based on the completion of the present procedure, or may complete the present procedure after the completion of the fifth process.

In the above-described procedure, the core network_B 190 transmits and/or receives the network-initiated session management request message to indicate to the UE_A 10 to stop or modify the congestion control that has already been applied by the UE_A 10. Furthermore, the UE_A 10 can stop or modify the congestion control applied by the UE_A 10 based on the network-initiated session management request message. Here, in a case that the UE_A 10 applies one or more congestion controls, the UE_A 10 may identify the congestion control to be stopped or modified based on the reception of the identification information included in the network-initiated session management request message from the core network_B 190. Note that each congestion control operation applied may be congestion control of a different type, congestion control corresponding to a different DNN, and/or congestion control corresponding to a different S-NNSAI, and/or congestion control having a difference in a combination of a DNN and an S-NSSAI.

2. Modified Examples

A program running on an apparatus according to the present invention may serve as a program that controls a Central Processing Unit (CPU) and the like to cause a computer to operate in such a manner as to implement the functions of the above-described embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for implementing such functions of the embodiment according to the present invention may be recorded on a computer-readable recording medium. This configuration may be implemented by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or a plurality of integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of a known type, a controller, a micro-controller, or a state machine. The above-mentioned electric circuit may include a digital circuit, or may include an analog circuit. Furthermore, in a case that a circuit integration technology that replaces the present integrated circuit appears with advances in semiconductor technology, one or more aspects of the present invention can also use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

REFERENCE SIGNS LIST

1 Mobile communication system
5 DN_A
6 PDN_A
10 UE_A
20 UTRAN_A
22 NB_A
24 RNC_A
30 PGW_A
35 SGW_A
40 MME_A
45 eNB_A
50 HSS_A
80 E-UTRAN_A
90 Core network_A
120 NG-RAN_A
122 NR node_A
190 Core network_B
230 SMF_A
235 UPF_A
239 UPF_C
240 AMF_A

The invention claimed is:
1. A User Equipment (UE), comprising:
a controller configured to:
send a Protocol Data Unit (PDU) session establishment request message,
start a first timer on a per Single Network Slice Selection Assistance information (S-NSSAI) basis with a first back-off timer value in a case that a first cause value to start the first timer and the first back-off timer value are included in a Protocol Data Unit (PDU) session establishment reject message received from a core network, the S-NSSAI being identified within a Public Land Mobile Network (PLMN),
start a second timer on a per S-NSSAI and Data Network Name (DNN) basis with a second back-off timer value in a case that a second cause value to start the second timer and the second back-off timer value are included in the PDU session establishment reject message received from the core network, the S-NSSAI being identified within a PLMN,
start a third timer on a per DNN basis with a third back-off timer value in a case that a third cause value to start the third timer and the third back-off timer value are included in the PDU session establishment reject message received from the core network, the first cause value, the second cause value, and the third cause value being different each other,
send another PDU session establishment request message in a case that the first cause value to start the first timer and the first back-off timer value indicating zero are included in the PDU session establishment reject message received from the core network,
send another PDU session establishment request message in a case that the second cause value to start the second timer and the second back-off timer value indicating zero are included in the PDU session establishment reject message received from the core network, and
send another PDU session establishment request message in a case that the third cause value to start the third timer and the third back-off timer value indicating zero are included in the PDU session establishment reject message received from the core network;
wherein the first cause value indicates that a specific slice is congested, the second cause value indicates that a specific slice and a DNN are congested, and the third cause value indicates that a DNN is congested.

* * * * *